United States Patent
Wang et al.

(10) Patent No.: US 11,775,041 B2
(45) Date of Patent: Oct. 3, 2023

(54) MULTI-PORT POWER SUPPLY DEVICE AND OPERATION METHOD THEREOF

(71) Applicant: VIA LABS, INC., New Taipei (TW)

(72) Inventors: Tze-Shiang Wang, New Taipei (TW);
Sheng-Hsien Yen, New Taipei (TW);
Hui-Neng Chang, New Taipei (TW)

(73) Assignee: VIA LABS, INC., New Taipei (TW)

( * ) Notice: Subject to any disclaimer, the term of this patent is extended or adjusted under 35 U.S.C. 154(b) by 16 days.

(21) Appl. No.: 17/488,330

(22) Filed: Sep. 29, 2021

(65) Prior Publication Data

US 2022/0137690 A1    May 5, 2022

Related U.S. Application Data

(60) Provisional application No. 63/107,396, filed on Oct. 29, 2020.

(30) Foreign Application Priority Data

Aug. 17, 2021   (TW) ................................ 110130380

(51) Int. Cl.
*G06F 1/26* (2006.01)
*G06F 13/42* (2006.01)
*H02J 1/10* (2006.01)

(52) U.S. Cl.
CPC .......... *G06F 1/266* (2013.01); *G06F 13/4282* (2013.01); *H02J 1/102* (2013.01); *G06F 2213/0042* (2013.01)

(58) Field of Classification Search
CPC .......... G06F 1/266; G06F 1/28; G06F 1/3215; G06F 1/3253; G06F 1/3287;

(Continued)

(56) References Cited

U.S. PATENT DOCUMENTS 10,108,243 B1* 10/2018 Chen ....................... G06F 13/00
10,439,390 B1* 10/2019 Hung ........................ H02J 1/14
(Continued)

FOREIGN PATENT DOCUMENTS

CN          105656162        6/2016
CN          109510478        3/2019
(Continued)

OTHER PUBLICATIONS

"Office Action of Taiwan Related Application, Application No. 110130379", dated Jun. 2, 2022, p. 1-p. 5.

(Continued)

*Primary Examiner* — Thomas J. Cleary
(74) *Attorney, Agent, or Firm* — JCIPRNET

(57) ABSTRACT

A multi-port power supply device and an operation method thereof are provided. The multi-port power supply device includes a power converter, a power switch, a current detection circuit, a voltage detection circuit, a control circuit, and multiple USB ports. The power converter supplies power to a USB port via a current path. The control circuit determines whether the USB port is connected to a USB device according to an actual voltage of the current path. When the USB port is not connected to the USB device, the control circuit turns off the current path. When the USB port is connected to the USB device, after a part of a power of other USB ports is dynamically transferred to the USB port, the control circuit determines whether to turn on the current path according to an actual current of the current path.

14 Claims, 7 Drawing Sheets

(58) Field of Classification Search
CPC ............... G06F 1/3296; G06F 13/4068; G06F 13/4282; G06F 2213/0042; H02J 1/102
See application file for complete search history.

(56) References Cited

U.S. PATENT DOCUMENTS

| | | | |
|---|---|---|---|
| 10,819,111 B2 | 10/2020 | Wang et al. | |
| 11,054,446 B1* | 7/2021 | Satyanarayana .. | H02M 3/33561 |
| 2004/0181697 A1* | 9/2004 | Chen ..................... | G05F 1/56 |
| | | | 713/300 |
| 2009/0200982 A1* | 8/2009 | Hurtz ..................... | G06F 1/3253 |
| | | | 320/114 |
| 2011/0068626 A1* | 3/2011 | Terlizzi ..................... | H02J 1/08 |
| | | | 307/32 |
| 2014/0325245 A1* | 10/2014 | Santini ..................... | H02J 1/14 |
| | | | 713/300 |
| 2016/0202743 A1* | 7/2016 | Li ........................... | H02M 1/10 |
| | | | 710/313 |
| 2016/0268828 A1* | 9/2016 | Mao ......................... | H02J 7/02 |
| 2017/0047852 A1* | 2/2017 | Huang ..................... | H03M 1/12 |
| 2018/0120910 A1* | 5/2018 | Farkas ..................... | G06F 1/26 |
| 2018/0323626 A1* | 11/2018 | Suen ......................... | B60L 1/006 |
| 2018/0341309 A1* | 11/2018 | Sporck ..................... | G06F 13/385 |
| 2019/0073012 A1* | 3/2019 | Sultenfuss ............. | H02J 7/0068 |
| 2019/0227609 A1* | 7/2019 | Koshigaya .............. | G06F 1/266 |
| 2019/0267817 A1* | 8/2019 | Weissinger ........... | H02J 7/0013 |
| 2019/0288532 A1* | 9/2019 | Mattos ..................... | H02J 7/0034 |
| 2020/0067307 A1* | 2/2020 | Yilmaz .............. | B64D 11/0624 |
| 2020/0257345 A1* | 8/2020 | Wang ..................... | G06F 13/4282 |
| 2020/0341036 A1* | 10/2020 | Liu ................... | G01R 19/16538 |
| 2021/0135476 A1* | 5/2021 | Shimamura ........ | H04N 1/00901 |
| 2021/0135477 A1* | 5/2021 | Hayashi ..................... | G06F 1/26 |
| 2021/0191486 A1* | 6/2021 | Chen ......................... | G06F 1/263 |
| 2021/0208654 A1* | 7/2021 | Bhattacharjee ......... | H02J 1/106 |
| 2021/0320514 A1* | 10/2021 | Polasa ................. | H02M 3/1563 |
| 2022/0113776 A1* | 4/2022 | Bhagavathula .......... | G06F 1/206 |
| 2022/0137688 A1* | 5/2022 | Wang ..................... | G06F 13/4282 |
| | | | 713/300 |
| 2022/0269327 A1* | 8/2022 | Yu ......................... | G06F 13/4282 |
| 2022/0302846 A1* | 9/2022 | Liu ......................... | H02M 3/158 |
| 2022/0337069 A1* | 10/2022 | Sporck ................. | H02J 7/0048 |
| 2022/0360102 A1* | 11/2022 | Zhang ................... | H02J 7/0047 |

FOREIGN PATENT DOCUMENTS

| | | |
|---|---|---|
| CN | 110829864 | 2/2020 |
| CN | 111030200 | 4/2020 |
| CN | 111628358 | 9/2020 |
| JP | 2016226152 | 12/2016 |
| TW | 201630305 | 8/2016 |
| TW | 201939299 | 10/2019 |
| TW | 201944260 | 11/2019 |
| TW | I706627 | 10/2020 |

OTHER PUBLICATIONS

"Office Action of Taiwan Counterpart Application, Application No. 110130380", dated May 26, 2022, p. 1-p. 3.

* cited by examiner

MULTI-PORT POWER SUPPLY DEVICE AND OPERATION METHOD THEREOF

CROSS-REFERENCE TO RELATED APPLICATION

This application claims the priority benefit of U.S. provisional application Ser. No. 63/107,396, filed on Oct. 29, 2020 and Taiwan application serial no. 110130380, filed on Aug. 17, 2021. The entirety of the above-mentioned patent applications is hereby incorporated by reference herein and made a part of this specification.

BACKGROUND

Technical Field

The disclosure relates to a power supply device, and in particular, to a power supply device including multiple ports and an operation method thereof.

Description of Related Art

Generally, when a power supply device provides power to an external universal serial bus (USB) device via a USB port, the power supply device is required to perform voltage conversion operations according to the rated specification of the USB device. For example, the power supply device may include a controller supporting a power delivery (PD) protocol. Based on the PD protocol, the power supply device may issue a power data object (PDO) or an augmented power data object (APDO) to the external USB device to determine an agreement power. The PDO (or APDO) contains information about the candidate output voltage and the candidate output current of the source. The power supply device may issue multiple PDOs (or APDOs) to the external USB device when establishing a new connection via the USB port. The external USB device will filter the PDOs (or APDOs) to determine appropriate voltage and current together with the power supply device and further establish a power supply agreement (i.e., determine the agreement power). Based on the determination of the agreement power (PDO or APDO), the output voltage (output power) of the power supply device can meet the requirement of the external USB device.

The power supply device may have multiple USB ports and multiple voltage converters corresponding to the USB ports to simultaneously provide different output voltages (output powers) to external USB devices having different requirements. In any case, once the agreement power between the power supply device and an external USB device is determined, a conventional power supply device does not change the agreement power (PDO or APDO) until the connection between the external USB device and the power supply device is cut off. If the agreement power (PDO or APDO) cannot be dynamically changed while the external USB device is connected to the power supply device, the power utilization efficiency of the power supply device cannot be optimized.

Furthermore, the external USB device may have a rated minimum charging power. When the agreement power is less than the rated minimum charging power, the charging operation of the external USB device is stopped. In practical applications, it is undesirable to stop the charging operation.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY

The disclosure provides a multi-port power supply device and an operation method thereof to manage power supply to universal serial bus (USB) ports.

In an embodiment of the disclosure, the multi-port power supply device includes a power converter, a power switch, a current detection circuit, a voltage detection circuit, a control circuit, and a plurality of USB ports. The USB ports include a first USB port. The power converter is configured to supply power to the first USB port via a current path. The power switch and the current detection circuit are disposed in the current path. The current detection circuit is configured to detect an actual current of the current path. The voltage detection circuit is configured to detect an actual voltage of the current path between the power switch and the first USB port. The control circuit is configured to control the power switch. The control circuit determines whether the first USB port is electrically connected to a USB device according to the actual voltage. When the control circuit determines that the first USB port is not electrically connected to the USB device, the control circuit turns off the power switch. When the control circuit determines that the first USB port is electrically connected to the USB device, after a part of an agreement power of at least one other USB port among the USB ports is dynamically transferred to the first USB port, the control circuit determines whether to turn on the power switch according to the actual current.

In an embodiment of the disclosure, the operation method includes the following steps. The current detection circuit detects an actual current of the current path. The voltage detection circuit detects an actual voltage of the current path between the power switch and the first USB port. The control circuit determines whether the first USB port is electrically connected to a USB device according to the actual voltage. When the control circuit determines that the first USB port is not electrically connected to the USB device, the control circuit turns off the power switch. When the control circuit determines that the first USB port is electrically connected to the USB device, after a part of an agreement power of at least one other USB port among the USB ports is dynamically transferred to the first USB port, the control circuit determines whether to turn on the power switch according to the actual current.

Based on the above, in the embodiments of the disclosure, after a part (or all) of the powers of other USB ports is dynamically transferred to the first USB port, the multi-port power supply device may determine whether to turn on the power switch according to the actual current. Therefore, the multi-port power supply device can manage the power supply to the USB ports and avoid occurrence of overcurrent and/or overvoltage in the multi-port power supply device.

To make the aforementioned more comprehensible, several embodiments accompanied with drawings are described in detail as follows.

DESCRIPTION OF THE EMBODIMENTS

Throughout the text of the specification (including the claims), the term "couple (or connect)" refers to any direct or indirect connection means. For example, where a first device is described to be coupled (or connected) to a second device in the text, it should be interpreted that the first device may be directly connected to the second device, or that the first device may be indirectly connected to the second device through another device or some connection means. The terms "first", "second", etc. mentioned in the description or claims are used to designate names of elements or distinguish among different embodiments or scopes and are not meant to designate upper or lower limits of numbers of elements. Moreover, wherever applicable, elements/components/steps referenced by the same numerals in the figures and embodiments refer to the same or similar parts. Elements/components/steps referenced by the same numerals or the same language in different embodiments may be mutually referred to for relevant descriptions.

Figure 1:
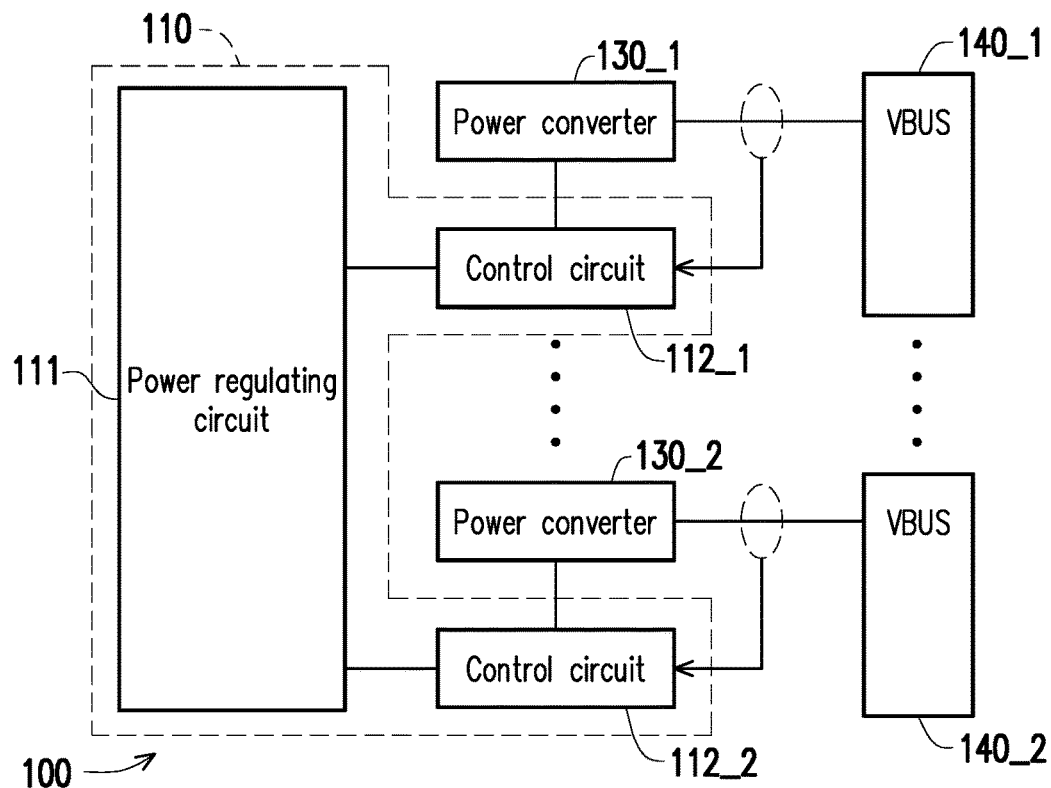
FIG. 1 is a circuit block diagram of a multi-port power supply device according to an embodiment of the disclosure.

FIG. 1 is a schematic circuit block diagram of a multi-port power supply device 100 according to an embodiment of the disclosure. The multi-port power supply device 100 includes a common control circuit 110 and a plurality of power converters (e.g., power converters 130_1 and 130_2 shown in FIG. 1) and a plurality of universal serial bus (USB) ports (e.g., USB ports 140_1 and 140_2 shown in FIG. 1). The number of the power converters 130_1 to 130_2 and the number of the USB ports 140_1 to 140_2 may be adjusted/set according to the actual design. According to the actual design, any one of the power converters 130_1 to 130_2 may include a DC to DC converter.

In the embodiment shown in FIG. 1, the common control circuit 110 is coupled to control terminals of the power converters 130_1 to 130_2. The common control circuit 110 may support multiple USB protocols depending on the actual design to meet the transmission requirements of the USB ports 140_1 to 140_2 of different specifications. For example, when any one of the USB ports 140_1 to 140_2 is a USB Type-C port, the common control circuit 110 may include a USB Type-C port controller (TCPC) or a USB Type-C port manager (TCPM) supporting the power delivery (PD) protocol. As another example, if any one of the USB ports 140_1 to 140_2 is a USB Type-A port, the common control circuit 110 may include a USB Type-A port manager supporting the QC (quick charge) protocol. As another example, when any one of the USB ports 140_1 to 140_2 is connected to a USB device having a programmable power supply (PPS) function, the common control circuit 110 may include a USB controller supporting the PPS protocol.

The common control circuit 110 may learn about configuration information (power requirements) from different USB devices (not shown) via the different USB ports 140_1 to 140_2. According to the configuration information, the common control circuit 110 may learn about the power requirements of the USB devices (not shown). For example, any one of the USB ports 140_1 to 140_2 may be a USB Type-C (also referred to as USB-C) port or a USB Type-A port. Taking the USB port 140_1 as an example, in some embodiments, the common control circuit 110 may learn about the configuration information of the USB device (not shown) via a configuration channel (CC) pin of the USB port 140_1. From the configuration information, the common control circuit 110 may learn about a voltage requirement, a current requirement, and/or a power requirement of the USB port 140_1.

The power converters 130_1 to 130_2 are respectively coupled to the USB ports 140_1 to 140_2 in a one-to-one manner. In other words, an output terminal of the power converter 130_1 is coupled to a power pin (power bus pin) VBUS of the USB port 140_1, and an output terminal of the power converter 130_2 is coupled to a power pin VBUS of the USB port 140_2. The common control circuit 110 is coupled to the power converters 130_1 to 130_2. According to the control of the common control circuit 110, the power converters 130_1 to 130_2 may supply power to different USB devices (not shown) via the power pins VBUS of the different USB ports 140_1 to 140_2.

For example, the common control circuit 110 may include a controller supporting the PD protocol. Based on the PD protocol, the common control circuit 110 may issue a power data object (PDO) or an augmented power data object (APDO) to the USB device (not shown) connected to the USB port 140_1 to determine an agreement power. Based on the determination of the agreement power (PDO or APDO), the common control circuit 110 may control output voltages (output powers) of the power converters 130_1 to 130_2. Therefore, the output voltage (output power) of the USB port 140_1 may meet the requirements of the USB device (not shown). Reference may be made to the relevant descriptions of the USB port 140_1 and the power converter 130_1 for descriptions of the USB port 140_2 and the power converter 130_2, which will not be repeated herein.

Figure 2:
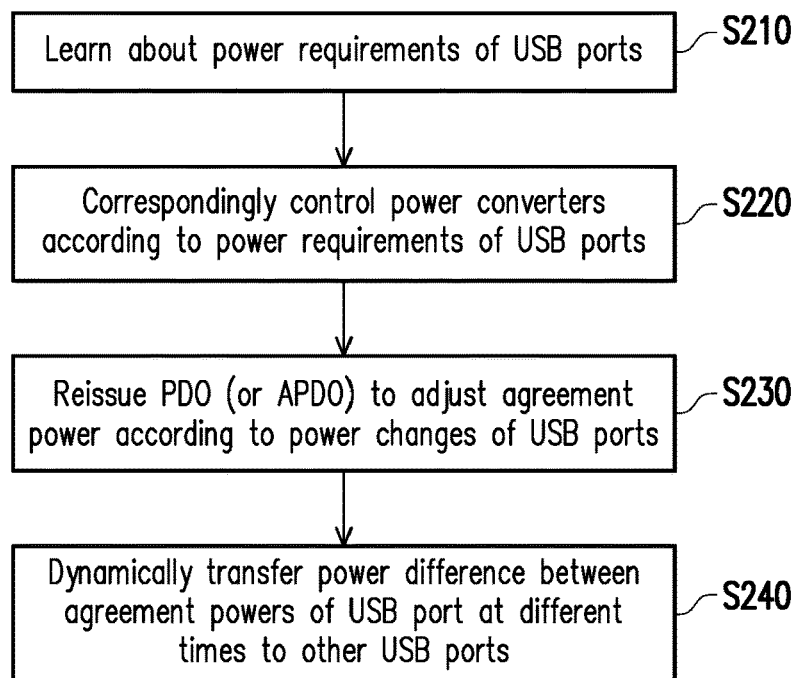
FIG. 2 is a flowchart of an operation method of a multi-port power supply device according to an embodiment of the disclosure.

FIG. 2 is a flowchart of an operation method of a multi-port power supply device according to an embodiment of the disclosure. Referring to FIG. 1 and FIG. 2 at the same time, in step S210, the common control circuit 110 learns about power requirements and actual power changes of the USB ports 140_1 to 140_2. For example, in some embodiments, the common control circuit 110 may learn about the power requirement of the USB port 140_1 via the CC pin of the USB port 140_1. In other embodiments, the common control circuit 110 may learn about the power requirement of the USB port 140_1 via differential data pins (not shown; generally labeled as D and D−) of the USB port 140_1. In step S220, the common control circuit 110 may correspondingly control the power converters 130_1 to 130_2 accordingly to the power requirements of the USB ports 140_1 to 140_2.

For example, based on the PD protocol, the common control circuit 110 may issue a PDO or an APDO to a USB device (not shown) connected to the USB port 140_1 to determine an agreement power. Based on the determination of the agreement power (PDO or APDO), the common control circuit 110 may control an output voltage (output power) of the power converter 130_1. Therefore, the output voltage (output power) of the USB port 140_1 may meet the requirement of the USB device (not shown). Reference may be made to the relevant descriptions of the USB port 140_1 and the power converter 130_1 for descriptions of the USB port 140_2 and the power converter 130_2, which will not be repeated herein.

Next, in step S230, according to power changes of the USB ports 140_1 to 140_2, the common control circuit 110 may reissue a PDO (or an APDO) to the USB device (not shown) connected to the USB port 140_1 to adjust the agreement power. For example, in some embodiments, the common control circuit 110 may detect an actual voltage and an actual current of the USB port 140_1 to learn about the power change of the USB port 140_1. The common control circuit 110 may decrease the agreement power of the USB port 140_1 from a first agreement power to a second agreement power. In step S240, the common control circuit 110 may dynamically transfer a power difference between the first agreement power of the USB port 140_1 at a first time and the second agreement power at a second time later than the first time to other USB ports (e.g., the USB port 140_2). Reference may be made to the relevant descriptions of the USB port 140_1 for descriptions of the USB port 140_2, which will not be repeated herein.

FIG. 3 to FIG. 6 are flowcharts of an operation method of a multi-port power supply device according to another embodiment of the disclosure. In this embodiment, in step S310 shown in FIG. 3, the common control circuit 110 obtains a rated power TP of the multi-port power supply device 100. In step S320 of FIG. 3, the common control circuit 110 determines whether the USB ports 140_1 to 140_2 are connected to USB devices. In this embodiment, the USB port 140_1 may be, for example, a USB Type-C port, and the USB port 140_2 may be, for example, a USB Type-A port. If the common control circuit 110 determines that only the USB Type-C port is connected to a USB device, the process proceeds to step node C.

Figure 4:
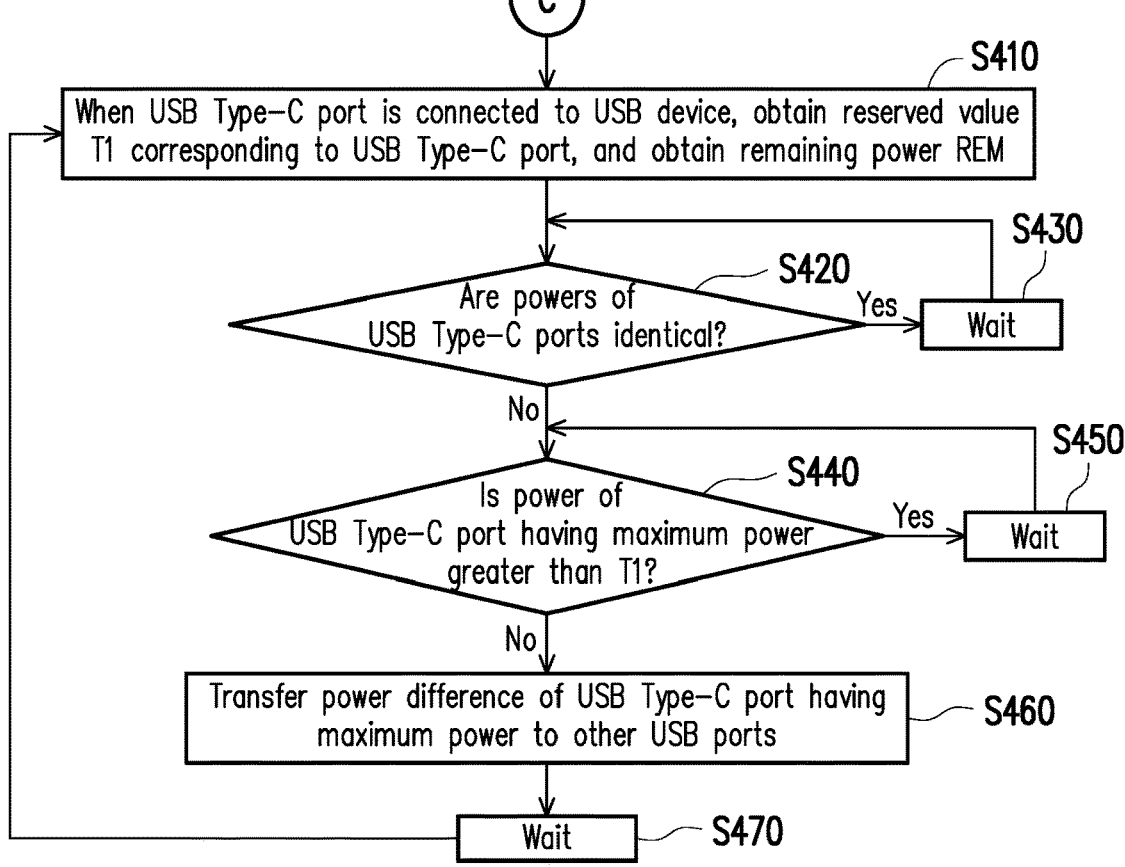

Next, in step S410 of FIG. 4, the common control circuit 110 may obtain a reserved value T1 corresponding to the USB Type-C port when the USB Type-C port is connected to a USB device, and calculate a remaining power REM by using the rated power TP of the multi-port power supply device 100 and a total power H. The reserved value T1 of the USB Type-C port is a real number. In this embodiment, the reserved value T1 is a product of a minimum rated voltage of the USB Type-C port and a maximum rated current of the USB Type-C port. For example, the minimum rated voltage of the USB Type-C port is 5 V, and the maximum rated current of the USB Type-C port is 3 A, so the reserved value T1 is equal to 15. The common control circuit 110 may calculate the total power H according to the power requirements of the USB ports 140_1 to 140_2. The total power H may be a sum of the power requirements (maximum powers) of the USB ports 140_1 to 140_2. The remaining power REM is a difference obtained by subtracting the powers of the USB ports connected to USB devices from the rated power TP of the multi-port power supply device 100.

In step S420, the common control circuit 110 determines whether the powers of the USB Type-C ports connected to USB devices are identical. If they are identical, it means that the output electric power of the USB Type-C port does not need to be transferred, so the process proceeds to step S430. In step S430, the common control circuit 110 waits. For example, the common control circuit 110 waits for (but not limited to) 10 minutes before returning to step S420.

In some embodiments, the common control circuit 110 further determines in step S420 whether the power of the USB Type-C port is greater than a minimum rated power of the USB Type-C port. If the common control circuit 110 determines that the power of the USB Type-C port is less than or equal to the minimum rated power of the USB Type-C port, subsequent operations are not performed. If the common control circuit 110 determines that the power of the USB Type-C port is greater than the minimum rated power of the USB Type-C port, subsequent operations may be performed.

In step S420, if the common control circuit 110 determines that the powers of the USB Type-C ports connected to USB devices are different, the process proceeds to step S440. In step S440, the common control circuit 110 determines whether the power of the USB Type-C port (e.g., a first USB port) having a maximum power is greater than the reserved value T1 corresponding to the USB Type-C port. If the common control circuit 110 determines that the power of the first USB port is greater than the reserved value T1 corresponding to the USB Type-C port, the process proceeds to step S450. In step S450, the common control circuit 110 waits. For example, the common control circuit 110 waits for (but not limited to) 10 minutes before returning to step S440. If the common control circuit 110 determines that the power of the first USB port is less than or equal to the reserved value T1 corresponding to the USB Type-C port, it means that the power of the first USB port has decreased. Therefore, the process proceeds to step S460 to start transferring a power difference of the first USB port to other USB ports (e.g., a second USB port). Once the transfer is completed, the process proceeds to step S470. In step S470, the common control circuit 110 waits. For example, the common control circuit 110 waits for (but not limited to) 10 minutes before returning to step S410.

In step S460, the common control circuit 110 may further calculate a voltage value and a current value of a new output power P3 by using the power of the first USB port at the first time, the reserved value T1, an original power of the second USB port at the first time, and the remaining power REM. The common control circuit 110 controls the power converters 130_1 to 130_2 after the second time to configure the new power to the second USB port. Specifically, the common control circuit 110 obtains a first reference value N1 according to Equation (1). Here, P1 is the power of the first USB port at the first time, P3 is the original power of the second USB port at the first time, and IP is the maximum rated current value. The first reference value N1 may be a positive integer or a positive real number.

$$N1=(P1-T1+P3+REM)/IP \qquad \text{Equation(1)}$$

According to the first reference value N1 being in different ranges, the common control circuit 110 provides a corresponding voltage value to the USB Type-C port that receives the power difference after the second time. For example, when the common control circuit 110 determines that the first reference value N1 is less than or equal to 5, the common control circuit 110 controls the power converters 130_1 to 130_2 to configure a voltage value of 5 V to the second USB port. When the common control circuit 110 determines that the first reference value N1 is greater than 5 and less than or equal to 9, the common control circuit 110 controls the power converters 130_1 to 130_2 to configure a voltage value of 5 V or 9 V to the second USB port. When the common control circuit 110 determines that the first reference value N1 is greater than 9 and less than or equal to 12, the common control circuit 110 controls the power converters 130_1 to 130_2 to configure a voltage value of 5 V, 9 V, or 12 V to the second USB port. When the common control circuit 110 determines that the first reference value N1 is greater than 12 and less than or equal to 15, the common control circuit 110 controls the power converters 130_1 to 130_2 to configure a voltage value of 5 V, 9 V, 12 V, or 15 V to the second USB port. When the common control circuit 110 determines that the first reference value N1 is greater than 15, the common control circuit 110 controls the power converters 130_1 to 130_2 to configure a voltage value of 5 V, 9 V, 12 V, 15 V, or 20 V to the second USB port.

Table 1 is a power supply comparison table of a multi-port power supply device according to an embodiment of the disclosure. CC1, CC2, and CC3 shown in Table 1 represent the configuration information of different USB ports. With respect to Configuration 12-1 and Configuration 12-2 shown in Table 1, from the configuration information CC1 to CC3 of Configuration 12-1, the common control circuit 110 may determine in step S420 that the powers of the USB Type-C ports connected to the USB devices are identical. Therefore, after entering Configuration 12-2, there will be no transfer of a power difference.

TABLE 1

Power supply comparison table of multi-port power supply device

| Config-uration | CC1 | CC2 | CC3 | Remaining power |
|---|---|---|---|---|
| 12-1 | 5 V/3 A | 5 V/3 A | 5 V/3 A | 15 W |
| 12-2 | 5 V/3 A | 5 V/3 A | 5 V/3 A | 15 W |
| 13-1 | 9 V/3 A | 9 V/2.67 A | 9 V/1 A | 0 W |
| 13-2 | 5 V/3 A | 9 V/2.67 A | 9 V/2.3 A | 0 W |
| 14-1 | 5 V/3 A | 9 V/2.67 A | 9 V/2.3 A | 0 W |
| 14-2 | 5 V/3 A | 5 V/3 A | 12 V/2.5 A | 0 W |
| 15-1 | 15 V/3 A | 9 V/1.5 A | | 1.5 W |
| 15-2 | 5 V/3 A | 15 V/3 A | | 0 W |
| 16-1 | 20 V/2.25 A | 9 V/1.5 A | | 1.5 W |
| 16-2 | 5 V/3 A | 15 V/3 A | | 0 W |

With respect to Configuration 13-1 and Configuration 13-2, from the configuration information CC1 to CC3 of Configuration 13-1, the common control circuit 110 may determine in step S420 that the powers of the USB Type-C ports connected to the USB devices are different. Since the configuration information CC1 indicates that the USB port 140_1 is the USB Type-C port having the maximum power (i.e., 27 W), the common control circuit 110 takes the USB port 140_1 as the first USB port. The configuration information CC3 indicates that another USB port (not shown) is the USB Type-C port having a minimum power (i.e., 9 W). The common control circuit 110 takes the another USB port (not shown) as the second USB port. In step S440, the common control circuit 110 determines whether the power of the USB port 140_1 decreases from being greater than the reserved value T1 corresponding to the USB Type-C port to being less than or equal to the reserved value T1. If the power of the USB port 140_1 transitioning from Configuration 13-1 to Configuration 13-2 (i.e., at the second time) decreases to be less than or equal to the reserved value T1 (i.e., the configuration information CC1 in Configuration 13-2), the process proceeds to step S460 to transfer the power difference to the second USB port. In step S460, the common control circuit 110 determines that the power of the USB port 140_1 (first USB port) decreases from 27 W to 15 W. In other words, the first USB port has finished or is about to finish charging (or supplying power to) the USB device. Therefore, the variation (i.e., 12 W) of the power decreased from 27 W to 15 W is taken as the power difference. Next, by using the power difference (i.e., 12 W) and the original power (i.e., 9 W) of the second USB port at the second time, the common control circuit 110 calculates the new power (i.e., 9+12=21 W). Accordingly, the power of the second USB port is increased from 9 W to 21 W. For the first USB port, the voltage value is adjusted to 5 V, and the current value is adjusted to 3 A. In Configuration 13-1 and Configuration 13-2, the first reference value N1 being equal to 7 may be obtained according to Equation (1). Accordingly, the voltage value of the second USB port may be 9 V. Also, the current value of the second USB port is a quotient (i.e., 2.3 A) of the new power and the voltage value.

With respect to Configuration 14-1 and Configuration 14-2, from the configuration information CC1 to CC3 of Configuration 14-1, the common control circuit 110 determines in step S420 that the powers of the USB Type-C ports connected to the USB devices are different. The configuration information CC2 indicates that the USB port 140_2 is the USB Type-C port having the maximum power (i.e., 24 W). It is assumed here that the common control circuit 110 takes the USB port 140_2 as the first USB port and takes another USB port (not shown) as the second USB port.

The common control circuit 110 determines in step S440 that the power of the first USB port transitioning from Configuration 14-1 to Configuration 14-2 (i.e., at the second time) decreases to be less than or equal to the reserved value T1, and thus the process proceeds to step S460 to transfer the power difference to the second USB port. In step S460, the common control circuit 110 determines that the power of the first USB port decreases from 24 W to 15 W. In other words, the first USB port has finished or is about to finish charging (or supplying power to) the USB device. Therefore, the variation (i.e., 9 W) of the power decreased from 24 W to 15 W is taken as the power difference. Next, by using the power difference (i.e., 9 W) and the original power (i.e., 21 W) of the second USB port at the second time, the common control circuit 110 calculates the new power (i.e., 21+9=30 W). Accordingly, the power of the second USB port is increased from 21 W to 30 W. For the first USB port, the voltage value is adjusted to 5 V, and the current value is adjusted to 3 A. In Configuration 14-1 and Configuration 14-2, the first reference value N1 being equal to 10 may be obtained according to Equation (1). Accordingly, in Configuration 14-2, the voltage value of the second USB port may be 12 V. Also, the current value of the second USB port is a quotient (i.e., 2.5 A) of the new power and the voltage value.

With respect to Configuration 15-1 and Configuration 15-2, from the configuration information CC1 to CC3 of Configuration 15-1, the common control circuit 110 determines in step S420 that the powers of the USB Type-C ports connected to the USB devices are different. The configuration information CC1 indicates that the USB port 140_1 is the USB Type-C port having the maximum power (i.e., 45 W). It is assumed here that the common control circuit 110 takes the USB port 140_1 as the first USB port and takes the USB port 140_2 as the second USB port.

The common control circuit 110 determines in step S440 that the power of the first USB port transitioning from Configuration 15-1 to Configuration 15-2 (i.e., at the second time) decreases to be less than or equal to the reserved value T1, and thus the process proceeds to step S460 to transfer the power difference to the second USB port. In step S460, the common control circuit 110 determines that the power of the first USB port decreases from 45 W to 15 W. In other words, the first USB port has finished or is about to finish charging (or supplying power to) the USB device. Therefore, the variation (i.e., 30 W) of the power decreased from 45 W to 15 W is taken as the power difference. Next, by using the power difference (i.e., 30 W), the original power (i.e., 13.5 W) of the second USB port at the second time, and the remaining power (i.e., 1.5 W), the common control circuit 110 calculates the new power (i.e., 30+13.5+1.5=45 W). Accordingly, the power of the second USB port is increased from 13.5 W to 45 W. For the first USB port, the voltage value is adjusted to 5 V, and the current value is adjusted to 3 A. In Configuration 15-1 and Configuration 15-2, the first reference value N1 being equal to 15 may be obtained according to Equation (1). Accordingly, in Configuration 15-2, the voltage value of the second USB port may be 15 V. Also, the current value of the second USB port is a quotient (i.e., 3 A) of the new power and the voltage value.

Sufficient teachings regarding Configuration 16-1 and Configuration 16-2 may be obtained from the description for Configuration 15-1 and Configuration 15-2, which will not be repeated herein.

Referring to FIG. 1 and FIG. 3 to FIG. 6, if the common control circuit 110 determines in step S320 that the USB Type-C port and the USB Type-A port among the USB ports 140_1 to 140_2 are respectively connected to different USB devices, the process proceeds to step S330. In step S330, the common control circuit 110 determines whether at least one of the USB Type-C ports is connected to the USB device first. If the common control circuit 110 determines that at least one of the USB Type-C ports is connected to the USB device first, the process proceeds to step node D.

Figure 5:
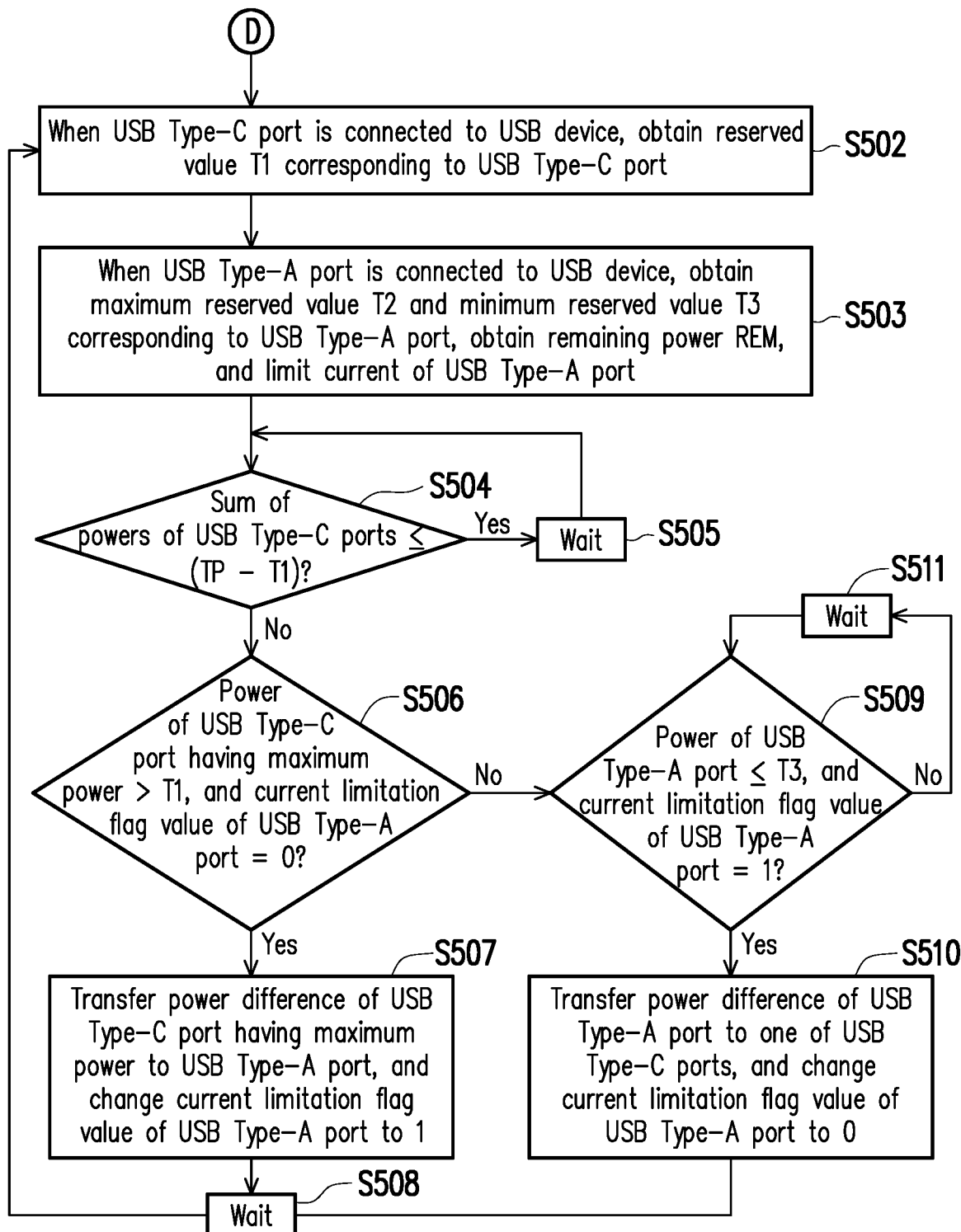

Next, in step S502 of FIG. 5, the common control circuit 110 obtains a reserved value T1 corresponding to the USB Type-C port when the USB Type-C port is connected to a USB device. The common control circuit 110 determines, through the USB Type-A port, whether the USB Type-A port is connected to a USB device. It is understood that in step S502, the common control circuit 110 may also perform the operations of steps S410 to S470. In step S503, the USB Type-A port is connected to a USB device. When the USB Type-A port is connected to a USB device, the common control circuit 110 obtains a maximum reserved value T2 and a minimum reserved value T3 corresponding to the USB Type-A port, and obtains a remaining power REM.

In this embodiment, the maximum reserved value T2 is a product of a minimum rated voltage of the USB Type-A port and a maximum rated current of the USB Type-A port. The minimum reserved value T3 is a product of the minimum rated voltage of the USB Type-A port and a minimum rated current of the USB Type-A port. In this embodiment, the minimum rated voltage of the USB Type-A port is 5 V; the maximum rated current of the USB Type-A port is 2.4 A; and the minimum rated current of the USB Type-A port is 1 A. Therefore, the maximum reserved value T2 is equal to 12, and the minimum reserved value T3 is equal to 5. The remaining power REM is a difference obtained by subtracting the powers of the USB ports (including the USB Type-C port and the USB Type-A port) connected to USB devices from the rated power TP.

In addition, in step S503, when the USB Type-A port is connected to the USB device, the current of the USB Type-A port is limited, and a current limitation flag value is set to 0. In this embodiment, the current of the USB Type-A port may be limited to be less than or equal to the minimum rated current of the USB Type-A port (e.g., 0.5 A), but the disclosure is not limited thereto. In this embodiment, a delay time duration at which the current limitation flag value is set to 0 needs to be greater than a maintained time duration (e.g., 3 seconds). The maintained time duration is a shortest time duration for performing steps S504 to S507 and is namely a shortest time required for transferring the power difference.

Next, the common control circuit 110 determines in step S504 whether a sum of the powers of the USB Type-C ports is less than or equal to a difference between the rated power TP and the reserved value T1. If the common control circuit 110 determines that the sum of the powers of the USB Type-C ports is less than or equal to the difference between the rated power TP and the reserved value T1, it means that the USB Type-A port may receive sufficient power of an output electric energy P4, and there is no need to transfer the output electric energy. Accordingly, the common control circuit 110 waits in step S505. For example, the common control circuit 110 may wait for (but not limited to) 10 minutes before returning to step S504. Conversely, if the common control circuit 110 determines that the sum of the powers of the USB Type-C ports is greater than the difference between the rated power TP and the reserved value T1, it means that the output electric energy needs to be transferred. Therefore, the common control circuit 110 determines in step S506 whether the power of the USB Type-C port having the maximum power is greater than the reserved value T1 and whether the current limitation flag value of the USB Type-A port is equal to 0. If the determination result of the above is "Yes", it means that the USB Type-A port is in a state of current limitation and the USB Type-C port having the maximum power has sufficient power to be transferred to the USB Type-A port. Therefore, in step S507, the common control circuit 110 releases the current limitation on the USB Type-A port, transfers the power difference of the USB Type-C port having the maximum power to the USB Type-A port, and changes the current limitation flag value of the USB Type-A port to 1. Once the transfer is completed, the process proceeds to step S508. For example, the common control circuit 110 may wait for (but not limited to) 10 minutes before returning to step S502. In an embodiment, the current limitation flag value may also be changed from 1 to 0.

In step S507, for example, for the USB Type-A port, the voltage value is fixed to 5 V, and the current value is adjusted from the limited 0.5 A to 2.4 A. In step S507, the common control circuit 110 may further calculate a voltage value and a current value of a new output power P3 by using the power of the USB Type-C port having the maximum power at the second time, the maximum reserved value T2, and the remaining power REM. The common control circuit 110 controls the power converters 130_1 to 130_2 to configure the new power to the second USB port after the second time. Specifically, the common control circuit 110 may obtain a second reference value N2 according to Equation (2). Here, P3 is the power of the USB Type-C port having the maximum power at the second time, and the second reference value N2 may be a positive integer or a positive real number.

$$N2=(P3-T2+REM)/IP \qquad \text{Equation (2)}$$

According to the second reference value N2 being in different ranges, the common control circuit 110 provides a corresponding voltage value to the USB Type-C port having the maximum power before the second time. In an embodiment, according to the second reference value N2 being in different ranges, the common control circuit 110 provides a corresponding voltage value to any other USB Type-C port. Sufficient teachings regarding implementation details of the corresponding voltage value provided based on the second reference value N2 being in different ranges may be obtained from implementation details of the first reference value N1, which will not be repeated herein.

If the determination result in step S506 is "No", the process proceeds to step S509. In step S509, the common control circuit 110 determines whether the power of the USB Type-A port is less than or equal to the minimum reserved value T3 and whether the current limitation flag value of the USB Type-A port is equal to 1. If the determination result of the above is "Yes", it means that the current limitation on the USB Type-A port has been released and the power of the USB Type-A port has decreased to be less than or equal to the minimum reserved value T3. In other words, the USB Type-A port has finished or is about to finish charging (or supplying power to) the USB device. In step S510, the common control circuit 110 transfers the power difference of the USB Type-A port to one of the USB Type-C ports, and changes the current limitation flag value of the USB Type-A port to 0. Once the transfer is completed, the process proceeds to step S508.

In step S510, for example, for the USB Type-A port, the voltage value is fixed to 5 V, and the current value is adjusted form 2.4 A to 1 A. In step S510, the common control circuit 110 may further calculate a voltage value and a current value of a new output power P3 by using the power of the USB Type-C port having the maximum power at the second time, the maximum reserved value T2, and the remaining power REM. The common control circuit 110 controls the power converters 130_1 to 130_2 to configure the new power to the second USB port after the second time. Specifically, the common control circuit 110 may obtain a third reference value N3 according to Equation (3). Here, P4 is the power of the USB Type-A port at the second time, and the third reference value N3 may be a positive integer or a positive real number.

$$N3=(P3+T2-P4+REM)/IP \qquad \text{Equation (3)}$$

According to the third reference value N3 being in different ranges, the common control circuit 110 provides a corresponding voltage value to the USB Type-C port having the maximum power before the second time. In an embodiment, according to the third reference value N3 being in different ranges, the common control circuit 110 provides the corresponding voltage value to any other USB Type-C port. Sufficient teachings regarding implementation details of the corresponding voltage value provided based on the third reference value N3 in different ranges may be obtained from implementation details of the first reference value N1, which will not be repeated herein.

If the determination result in step S509 is "No", the process proceeds to step S511 and waits. For example, the common control circuit 110 may wait for (but not limited to) 10 minutes before returning to step S509. Table 2 shows a power supply comparison table of a multi-port power supply device according to an embodiment of the disclosure. CC1, CC2, CC3, and CC4 shown in Table 2 represent configuration information of different USB ports.

TABLE 2

Power supply comparison table of multi-port power supply device

| Configuration | CC1 (Type-C) | CC2 (Type-C) | CC3 (Type-C) | CC4 (Type-A) | Current limitation flag value |
|---|---|---|---|---|---|
| 17 | 5 V/3 A | 5 V/3 A | 5 V/3 A | 5 V/2.4 A | 0 |
| 18 | 9 V/3 A converted to 5 V/3 A | 9 V/2 A | 5 V/3 A | 5 V/0.5 A converted to 5 V/2.4 A | 1 |
| 19 | 12 V/3 A converted to 9 V/2.6 A | 9 V/1 A | 5 V/3 A | 5 V/0.5 A converted to 5 V/2.4 A | 1 |
| 20 | 15 V/3 A converted to 12 V/2.7 A | 5 V/3 A |  | 5 V/0.5 A converted to 5 V/2.4 A | 1 |
| 21 | 20 V/2.5 A converted to 15 V/2.6 A | 9 V/1 A |  | 5 V/0.5 A converted to 5 V/2.4 A | 1 |
| 22 | 20 V/3 A converted to 20 V/2.4 A |  |  | 5 V/0.5 A converted to 5 V/2.4 A | 1 |
| 23 | 5 V/3 A | 9 V/2 A converted to 9 V/2.7 A | 5 V/3 A | 5 V/2.4 A converted to 5 V/1 A | 0 |
| 24 | 9 V/2.6 A converted to 12 V/2.6 A | 9 V/1 A | 5 V/3 A | 5 V/2.4 A converted to 5 V/1 A | 0 |
| 25 | 12 V/2.7 A converted to 15 V/2.6 A | 5 V/3 A |  | 5 V/2.4 A converted to 5 V/1 A | 0 |
| 26 | 15 V/2.6 A converted to 20 V/2.3 A | 9 V/1 A |  | 5 V/2.4 A converted to 5 V/1 A | 0 |
| 27 | 20 V/2.4 A converted to 20 V/2.75 A |  |  | 5 V/2.4 A converted to 5 V/1 A | 0 |

Referring to FIG. 1, FIG. 5, and Table 2 at the same time, in this example, a time point at which the USB Type-C port is connected to the USB device is earlier than a time point at which the USB Type-A port is connected to the USB device. When the USB Type-A port is connected to the USB device, the current of USB Type-A port is limited. Accordingly, for the USB Type-A port, the voltage value is 5 V, and the current value is 0.5 A. The power of the USB Type-A port is 2.5 W. Also, at this time point, the current limitation flag value of the USB Type-A port is set to 0.

With respect to Configuration 17, the common control circuit 110 determines in step S504 that the sum (i.e., 45 W) of the powers of the USB Type-C ports is equal to the difference (i.e., 45 W) between the rated power TP and the reserved value T1. Accordingly, there is no need to transfer the output electric energies of the power converters 130_1 to 130_2.

With respect to Configuration 18, the common control circuit 110 may determine in step S504 that the sum (i.e., 60 W) of the powers of the USB Type-C ports is greater than the difference (i.e., 45 W) between the rated power TP and the reserved value T1. Therefore, the process proceeds to step S506. In step S506, the common control circuit 110 determines that the power (i.e., 27 W) of the USB Type-C port having the maximum power is greater than the reserved value T1 (i.e., 15 W), and determines that the current limitation flag value is equal to 0. Therefore, the process proceeds to step S507. In step S507, the common control circuit 110 controls the power converters 130_1 to 130_2 to release the current limitation on the USB Type-A port, and controls the power converters 130_1 and 130_2 to transfer the power difference of the USB Type-C port to the USB Type-A port. Specifically, the power of the USB Type-C port is 27 W minus 12 W so that the power is decreased to 15 W (i.e., the new power). The 12 W subtracted is the power difference. The power difference is allocated to the USB Type-A port to thereby increase the current value of the USB Type-A port from 0.5 A to 2.4 A. Next, the current limitation flag value is set to 1.

Further, with respect to Configuration 18, the second reference value N2 being equal to 5 may be obtained according to Equation (2). Accordingly, the voltage value of the USB port 140_1 may be adjusted to 5 V. Also, the current value of the USB port 140_1 is a quotient (i.e., 3 A) of the new power and the voltage value. With respect to Configuration 19 to Configuration 22, sufficient teachings regarding the processes in Configuration 19 to Configuration 22 may be obtained from the description for Configuration 18, which will not be repeated herein.

With respect to Configuration 23, the common control circuit 110 determines in step S504 that the sum (i.e., 48 W) of the powers of the USB Type-C ports is greater than the difference (i.e., 45 W) between the rated power TP and the reserved value T1. Therefore, the process proceeds to step S506. In step S506, the common control circuit 110 determines that the power (i.e., 18 W) of the USB Type-C port having the maximum power is greater than the reserved value T1 (i.e., 15 W), and determines that the current limitation flag value is equal to 1. Therefore, the process proceeds to step S509. In step S509, the common control circuit 110 determines that the power of the USB Type-A port decreases to 5 W (which is already equal to the minimum reserved value T3), and determines that the current limitation flag value of the USB Type-A port is equal to 1. Therefore, the process proceeds to step S510. In step S510, for the USB Type-A port, the voltage value is fixed to 5 V, and the current value is adjusted form 2.4 A to 1 A. Therefore, the power of the USB Type-A port is decreased from 12 W to 5 W to thereby generate the power difference of 7 W. Thus, the power difference of 7 W is, for example (but not limited to), transferred to the USB Type-C port. Accordingly, the power of the USB Type-C port is increased from 18 W to 25 W. Further, with respect to Configuration 23, the third reference value N3 being equal to 12.3 may be obtained according to Equation (3). Accordingly, the voltage value of the USB port 140_2 may be adjusted to 9 V. Also, the current value of the USB port 140_2 is a quotient (i.e., 2.7 A) of the new power and the voltage value.

With respect to Configuration 24 to Configuration 27, sufficient teachings regarding the processes in Configuration 24 to Configuration 27 may be obtained from the description for Configuration 23, which will not be repeated herein. It is noted that, in Configuration 23 to Configuration 27, the power difference of the USB Type-A port is transferred to the USB Type-C port having the maximum power. In this way, a charging speed for the USB device with a high power requirement may be accelerated. In some embodiments, the power difference may be transferred to the USB Type-C port having the minimum power, but the disclosure is not limited thereto.

Figure 3:
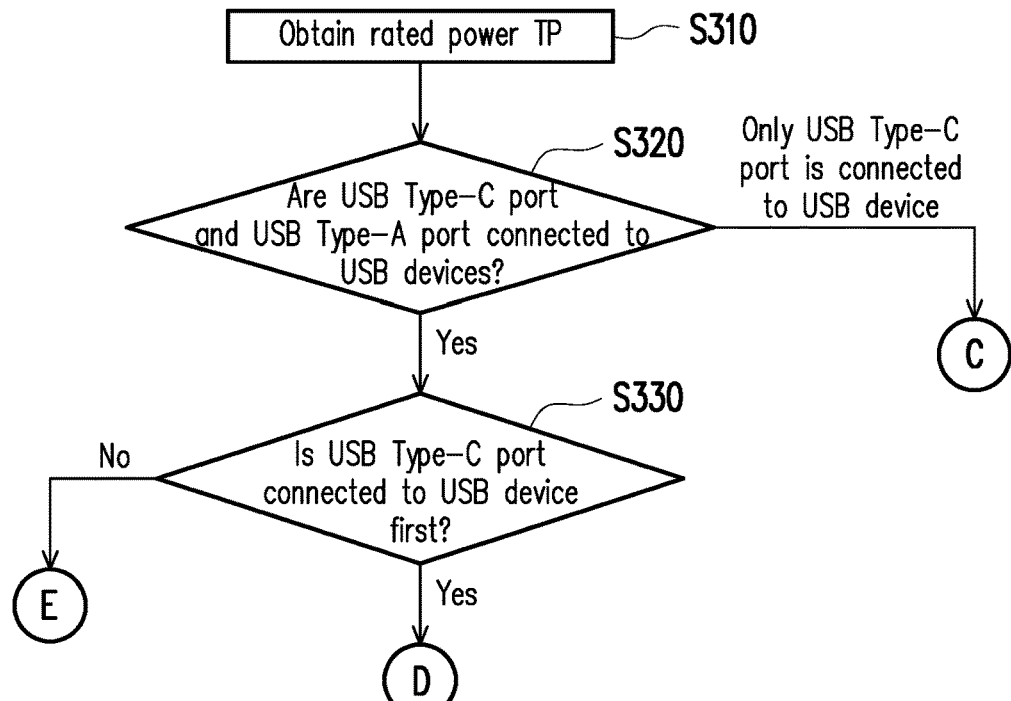
FIG. 3 to FIG. 6 are flowcharts of an operation method of a multi-port power supply device according to another embodiment of the disclosure.

In step S330 shown in FIG. 3, the common control circuit 110 determines whether at least one of the USB Type-C ports is connected to a USB device first. If the common control circuit 110 determines that the USB Type-A port is connected to a USB device first, the process proceeds to step node E.

Figure 6:
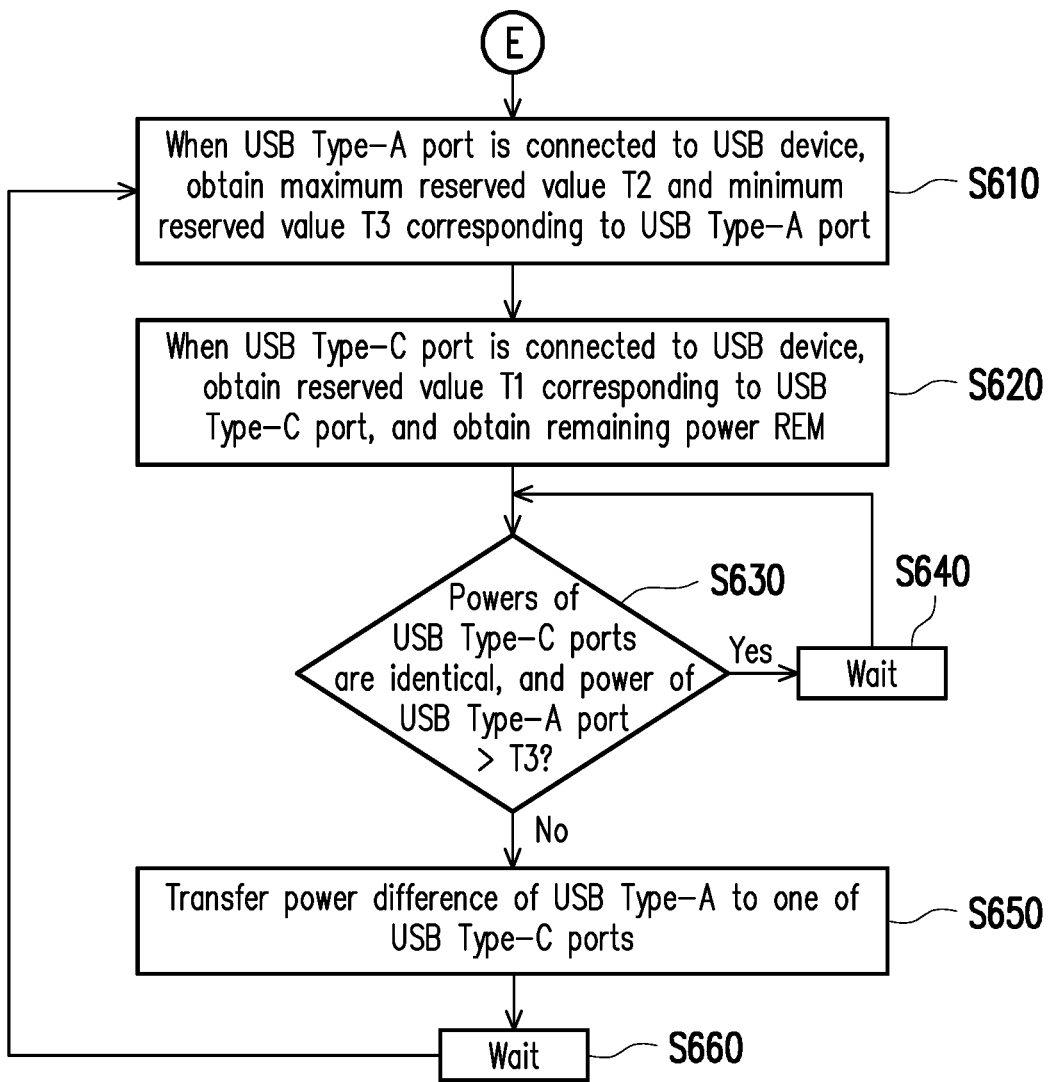

Next, in step S610 of FIG. 6, when the USB Type-A port is connected to a USB device, the common control circuit 110 obtains a maximum reserved value T2 and a minimum reserved value T3 corresponding to the USB Type-A port. In step S620, the USB Type-C port is connected to a USB device. When the USB Type-C port is connected to a USB device, the common control circuit 110 obtains a reserved value T1 corresponding to the USB Type-C port, and obtains a remaining power REM. Further, in step S610, since the current of the USB Type-A port is not limited, the current limitation flag value is set to 1.

In step S630, the common control circuit 110 determines whether the powers of the USB Type-C ports are identical, and whether the power of the USB Type-A port is greater than the minimum reserved value T3. If the determination result of the above is "Yes", it means that the power of the USB Type-A port is still being used, and the powers of the USB Type-C ports connected to USB devices are identical. Therefore, there is no need to transfer the output electric energy, so the process proceeds to step S640. In step S640, the common control circuit 110 waits. For example, the common control circuit 110 may wait for (but not limited to) 10 minutes before returning to step S630.

In step S630, if the determination result is "No", it means that the power of the USB Type-A port has decreased to be less than or equal to the minimum reserved value T3, or the power of at least one of the USB Type-C ports has changed (or is not exactly the same). In other words, the USB Type-A port has finished or is about to finish charging (or supplying power to) the USB device, so the USB Type-A port may transfer the power difference to one of the USB Type-C ports. In step S650, the common control circuit 110 sets the current value of the USB Type-A port from the maximum rated current (e.g., 2.4 A) to the minimum rated current (e.g., 1 A), and transfers the power difference of the USB Type-A port to one of the USB Type-C ports (e.g., the USB Type-C port having the maximum power). Sufficient teachings regarding implementation details in step S650 may be obtained from the description for step S510, which will not be repeated herein. Further, in step S650, since the current of the USB Type-A port may be regarded as being limited at the minimum rated current, the current limitation flag value is set to 0. Once the transfer is completed, the process proceeds to step S660. In step S660, the common control circuit 110 waits. For example, the common control circuit 110 may wait for (but not limited to) 10 minutes before returning to step S610.

Table 3 shows a power supply comparison table of a multi-port power supply device according to an embodiment of the disclosure. CC1, CC2, CC3, and CC4 shown in Table 3 represent configuration information of different USB ports. In the example shown in Table 3, a time point at which the USB Type-A port is connected to the USB device is earlier than a time point at which the USB Type-C port is connected to the USB device.

TABLE 3

Power supply comparison table of multi-port power supply device

| Configuration | CC1 (Type-C) | CC2 (Type-C) | CC3 (Type-C) | CC4 (Type-A) |
|---|---|---|---|---|
| 28 | 5 V/3 A | 5 V/3 A | 5 V/3 A | 5 V/2.4 A |
| 29 | 9 V/2 A converted to 9 V/2.9 A | 9 V/1.5 A | 5 V/3 A | 5 V/2.4 A converted to 5 V/1 A |
| 30 | 9 V/2.6 A converted to 12 V/2.6 A | 9 V/1 A | 5 V/3 A | 5 V/2.4 A converted to 5 V/1 A |
| 31 | 12 V/2.7 A converted to 15 V/2.7 A | 5 V/3 A | | 5 V/2.4 A converted to 5 V/1 A |
| 32 | 15 V/2.6 A converted to 20 V/2.3 A | 9 V/1 A | | 5 V/2.4 A converted to 5 V/1 A |
| 33 | 20 V/2.4 A converted to 20 V/2.7 A | | | 5 V/2.4 A converted to 5 V/1 A |

With respect to Configuration 28 shown in Table 3, the common control circuit 110 determines in step S630 that the powers of the USB Type-C ports are identical, and the power of the USB Type-A port is greater than the minimum reserved value T3. The output electric energy of the power converters 130_1 to 130_2 is not transferred. With respect to Configuration 29 shown in Table 3, the common control circuit 110 determines in step S630 that the powers of the USB Type-C ports are different. When the power of the USB Type-A port decreases from 12 W to 5 W, the power difference of 7 W may be transferred to one of the USB Type-C ports. After the power difference is received by the USB Type-C port, according to the power difference and the remaining power (i.e., 1.5 W), the power of the USB Type-C port is increased from 18 W to 26.5 W. Further, with respect to Configuration 29, the third reference value N3 being equal to 8.8 may be obtained according to Equation (3). Accordingly, the voltage value of the USB Type-C port may be adjusted to 9 V. Also, the current value of the USB Type-C port is a quotient (i.e., 2.9 A) of the new power and the voltage value. With respect to Configuration 30 to Configuration 33 shown in Table 3, sufficient teachings regarding the processes in Configuration 30 to Configuration 33 may be obtained from the description for Configuration 29, which will not be repeated herein.

Figure 7:
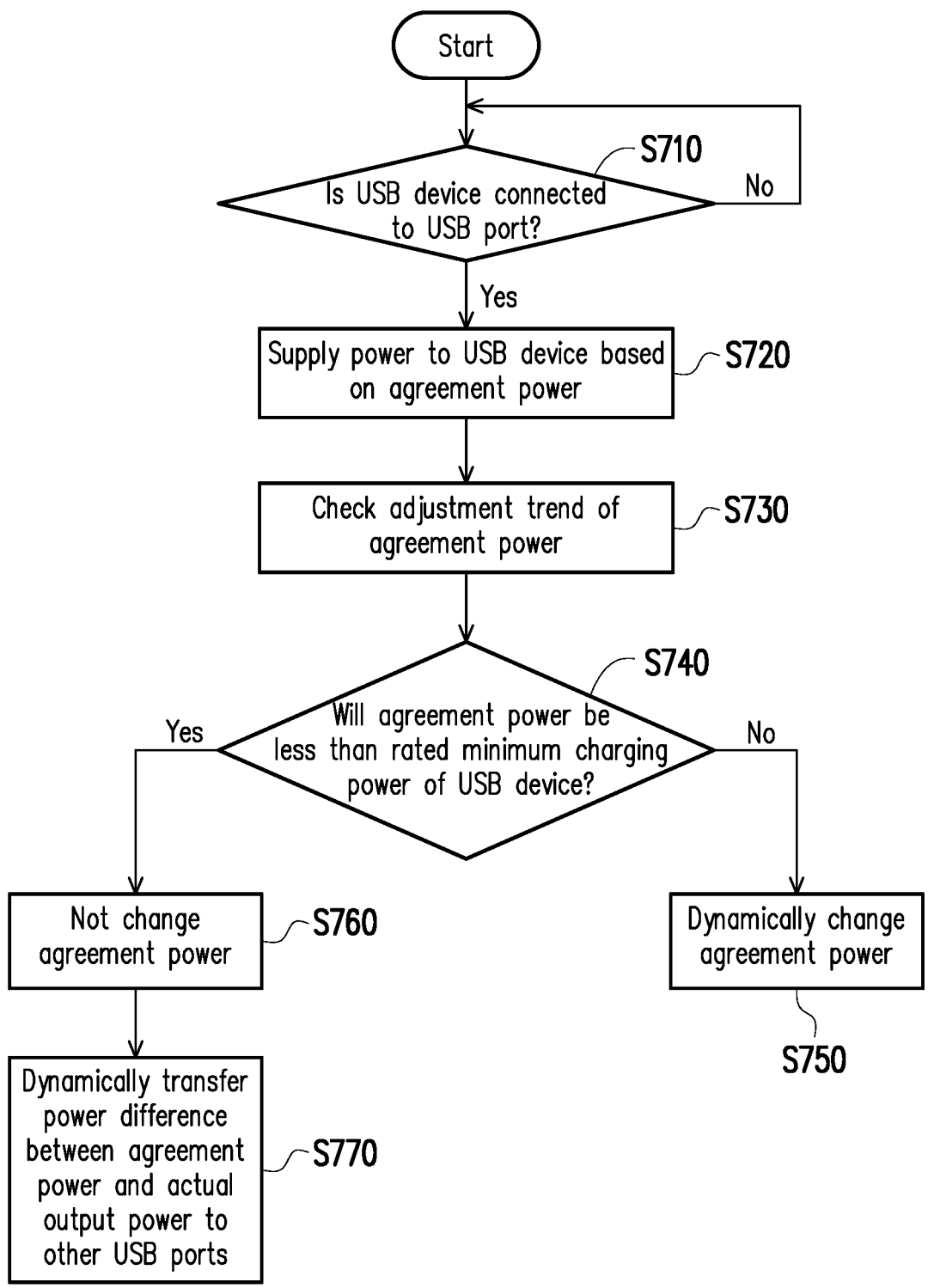
FIG. 7 is a flowchart of an operation method of a multi-port power supply device according to another embodiment of the disclosure.

FIG. 7 is a flowchart of an operation method of a multi-port power supply device according to another embodiment of the disclosure. Referring to FIG. 1 and FIG. 7, the common control circuit 110 may determine in step S710 whether the USB port 140_1 is connected to a USB device. Although the USB port 140_1 is taken as an example in this embodiment, reference may be made to the relevant descriptions of the USB port 140_1 for descriptions of other USB ports (e.g., the USB port 140_2) of the multi-port power supply device 100.

When the common control circuit 110 determines that the USB port 140_1 is connected to a USB device (the determination result of step S710 is "Yes"), the common control circuit 110 performs step S720. In step S720, according to the power requirement of the USB port 140_1, the common control circuit 110 may correspondingly control the power converter 130_1 to supply power to the USB device (not shown) connected to the USB port 140_1. Reference may be made to the relevant descriptions of steps S210 and S220 shown in FIG. 2 for descriptions of step S720 shown in FIG. 7, which will not be repeated herein. Based on the PD protocol, the common control circuit 110 may issue a PDO (or an APDO) to the USB device (not shown) connected to the USB port 140_1 in step S720 to determine an agreement power. The common control circuit 110 may correspondingly control the power converter 130_1 according to the agreement power to supply power to the connected USB port 140_1.

In step S730, the common control circuit 110 may check an adjustment trend of the agreement power of the USB port. For example, the power converter 130_1 may supply power to the USB port 140_1 via a current path, and the common control circuit 110 may detect an actual current and an actual voltage of the current path by a current detection circuit (not shown in FIG. 1) and a voltage detection circuit (not shown in FIG. 1). The common control circuit 110 may learn about an actual output power of the USB port 140_1 based on the actual current and the actual voltage. The common control circuit 110 may determine whether the current PDO or APDO (agreement power) matches the actual output power of the USB port 140_1. If the actual output power is lower than the agreement power, it means that the adjustment trend of the agreement power is a "downward adjustment". If the actual output power is higher than the agreement power, it means that the adjustment trend of the agreement power is an "upward adjustment".

In step S740, the common control circuit 110 may check a rated minimum charging power of the USB device (not shown) connected to the USB port 140_1. The USB device (not shown) may have a rated minimum charging power. When the PDO or APDO (agreement power) is less than the rated minimum charging power, the charging operation of the USB device (not shown) is stopped. In practical applications, it is undesirable to stop the charging operation. The common control circuit 110 may learn about the rated minimum charging power of the USB device (not shown) connected to the USB port 140_1. This embodiment does not limit the specific implementation details about how "the common control circuit 110 learns about the rated minimum charging power".

For example, in some embodiments, when a USB device (not shown) is connected to the USB port 140_1, the common control circuit 110 may issue a query command to the USB device to obtain the rated minimum charging power of the USB device. The query command may be a vendor command that meets the USB specification.

In other embodiments, when a USB device (not shown) is connected to the USB port 140_1, the common control circuit 110 may obtain the rated minimum charging power of the USB device (not shown) from a lookup table. This embodiment does not limit the specific implementation details of the lookup table. For example, the lookup table may be a lookup table shown in Table 4 or Table 5 below.

TABLE 4

Lookup table

| PID | VID T | Pmin |
|---|---|---|

TABLE 5

Lookup table

| PID | VID | Agreement power | Pmin | Vmin | Imin |
|---|---|---|---|---|---|

When a USB device (not shown) is connected to the USB port 140_1, the common control circuit 110 may learn about identification (ID) information of the USB device (not shown) such as product ID (PID) information and vendor ID (VID) information. In some embodiments, the common control circuit 110 may obtain a rated minimum charging power Pmin of the USB device (not shown) from the lookup table shown in Table 4 according to the PID information and the VID information. In other embodiments, the common control circuit 110 may obtain a rated minimum charging power Pmin, a rated minimum charging voltage Vmin, and a rated minimum charging current Imin of the USB device (not shown) from the lookup table shown in Table 5 according to the PID information and the VID information.

When the lookup table does not contain the rated minimum charging power of the USB device (not shown), the common control circuit 110 may issue a query command to the USB device (not shown) connected to the USB port 140_1 to obtain the rated minimum charging power of the USB device (not shown). The common control circuit 110 may record the rated minimum charging power provided by the USB device (not shown) in the lookup table for future use.

When the lookup table does not contain the rated minimum charging power of the USB device (not shown), or when the common control circuit 110 issues a query command to the USB device (not shown) connected to the USB port 140_1, the USB device only responds with a rated charging power to the common control circuit 110. The rated charging power is only sent according to the USB PD protocol and does not indicate that it is the rated minimum charging power of the USB device. At this time, the common control circuit 110 needs to find the rated minimum charging power of the USB device according to the following method.

When receiving the rated charging power, the common control circuit 110 may first provide the corresponding agreement power to the USB device. The common control circuit 110 may detect the actual current of the current path by the current detection circuit (not shown in FIG. 1). The common control circuit 110 may learn about whether the USB port 140_1 is charging based on the actual current. The common control circuit 110 may determine whether the actual current is greater than a self-defined value. If the actual current is greater than the self-defined value, the agreement power is decreased by 15 W (one step), and then the actual current of the current path is detected. Repeating this operation in the same manner, when the actual current is less than the self-defined value, it means that the agreement power before the current decrease is the rated minimum charging power of the USB device. The common control circuit 110 may record the rated minimum charging power provided by the USB device (not shown) in the lookup table for future use.

If the actual current is less than the self-defined value, the agreement power is increased by 15 W (one step), and then the actual current of the current path is detected. Repeating this operation in the same manner, when the actual current is greater than the self-defined value, it means that the agreement power of the current increase is the rated minimum charging power of the USB device. The common control circuit 110 may record the rated minimum charging power provided by the USB device (not shown) in the lookup table for future use.

In step S740, the common control circuit 110 may check the agreement power and the rated minimum charging power of the USB device (not shown). When the adjustment trend associated with the agreement power of the USB port 140_1 will make the agreement power greater than the rated minimum charging power of the USB device (not shown) connected to the USB port 140_1 (the determination result of step S740 is "No"), the common control circuit 110 may perform step S750. Alternatively, when the USB device (not shown) connected to the USB port 140_1 does not have an operation limitation on the rated minimum charging power (the determination result of step S740 is "No"), the common control circuit 110 may perform step S750.

In step S750, the common control circuit 110 may dynamically change the agreement power of the USB port 140_1 according to the actual output power of the USB port 140_1. In other words, in step S750, the common control circuit 110 may dynamically change the PDO (or the APDO) according to the actual output power, and the common control circuit 110 may dynamically transfer a power difference between the agreement power of the USB port 140_1 at a first time and the agreement power of the USB port 140_1 at a second time to other USB ports (e.g., the USB port 140_2) of the multi-port power supply device 100. Reference may be made to the relevant descriptions of steps S210 to S240 shown in FIG. 2 or the relevant descriptions of FIG. 3 to FIG. 6 for descriptions of step S750 shown in FIG. 7, which will not be repeated herein.

When the adjustment trend associated with the agreement power of the USB port 140_1 will make the agreement power less than the rated minimum charging power of the USB device (not shown) (the determination result of step S740 is "Yes"), the common control circuit 110 may perform step S760. In step S760, even if the actual power of the USB port 140_1 is less than the agreement power of the USB port 140_1, the common control circuit 110 still does not change the PDO or the APDO (agreement power) of the USB port 140_1. The purpose of step S760 is to prevent the agreement power (PDO or APDO) from being less than the rated minimum charging power of the USB device (not shown), so as to avoid stopping the charging operation of the USB device (not shown).

During the period in which the agreement power is maintained, the actual power of the USB port 140_1 is less than the agreement power, and the actual power of the USB port 140_1 may even keep decreasing. In step S770, the common control circuit 110 may dynamically transfer the power difference between the agreement power and the actual output power to other USB ports (e.g., the USB port 140_2). When the USB device (not shown) is disconnected from the USB port 140_1, the common control circuit 110 may transfer the agreement power of the USB port 140_1 to other USB ports (e.g., the USB port 140_2).

In the embodiment shown in FIG. 1, the common control circuit 110 includes a power regulating circuit 111 and a plurality of control circuits (e.g., control circuits 112_1 and 112_2 shown in FIG. 1). The control circuits 112_1 to 112_2 are respectively coupled to the USB ports 140_1 to 140_2 in a one-to-one manner to learn about the actual output powers of the USB ports 140_1 to 140_2 and to respectively control the power converters 130_1 to 130_2 to supply power to the USB ports 140_1 to 140_2. For example, the control circuit 112_1 may detect the actual current and the actual voltage of the USB port 140_1 by the current detection circuit (not shown in FIG. 1) and the voltage detection circuit (not shown in FIG. 1), and learn about the actual output power of the USB port 140_1 based on the actual current and the actual voltage of the USB port 140_1. Analogously, the control circuit 112_2 may detect the actual current and the actual voltage of the USB port 140_2 by the current detection circuit (not shown in FIG. 1) and the voltage detection circuit (not shown in FIG. 1), and learn about the actual output power of the USB port 140_2 based on the actual current and the actual voltage of the USB port 140_2.

The power regulating circuit 111 is coupled to the control circuits 112_1 to 112_2 to learn about the actual output powers of the USB ports 140_1 to 140_2. In step S730, the power regulating circuit 111 may check/determine the adjustment trends of the agreement powers of the USB ports 140_1 to 140_2 based on the actual output powers. For example, the power regulating circuit 111 may determine whether the current PDO or APDO (agreement power) matches the actual output power of the USB port 140_1. When the adjustment trend of the agreement power of the USB port 140_1 will make the agreement power of the USB port 140_1 greater than the rated minimum charging power of the USB device (not shown) connected to the USB port 140_1, the power regulating circuit 111 may dynamically change the agreement power of the USB port 140_1 according to the actual output power of the USB port 140_1 (see the relevant descriptions of step S750 shown in FIG. 7 for details).

When the adjustment trend of the agreement power of the USB port 140_1 will make the agreement power less than the rated minimum charging power of the USB device (not shown) connected to the USB port 140_1, the power regulating circuit 111 does not change the agreement power of the USB port 140_1, and the power regulating circuit 111 dynamically transfers the power difference between the agreement power and the actual output power of the USB port 140_1 to other USB ports (e.g., the USB port 140_2).

Figure 8:
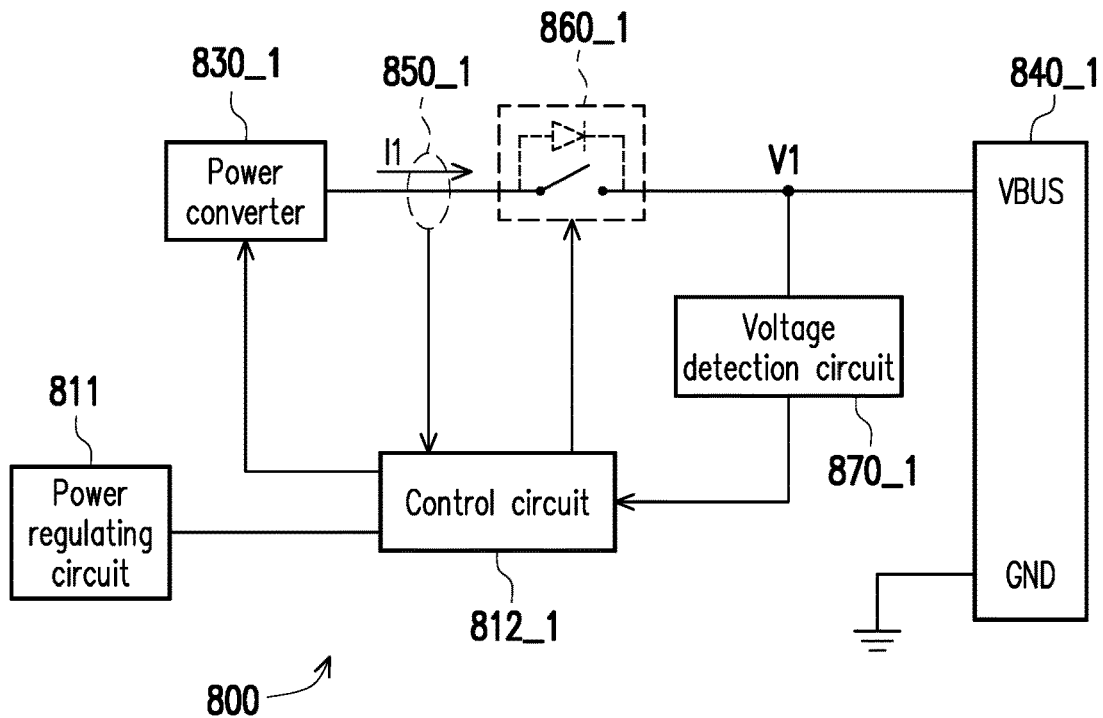
FIG. 8 is a circuit block diagram showing a multi-port power supply device according to another embodiment of the disclosure.

FIG. 8 is a circuit block diagram showing a multi-port power supply device 800 according to another embodiment of the disclosure. In the embodiment shown in FIG. 8, the multi-port power supply device 800 includes a plurality of USB ports such as a USB port 840_1. The multi-port power supply device 800 further includes a control circuit 812_1, a power converter 830_1, a current detection circuit 850_1, a power switch 860_1, and a voltage detection circuit 870_1. Reference may be made to the relevant descriptions of the multi-port power supply device 100, the control circuit 112_1, the power converter 130_1, and the USB port 140_1 shown in FIG. 1 for descriptions of the multi-port power supply device 800, the control circuit 812_1, the power converter 830_1, and the USB port 840_1 shown in FIG. 8, which will not be repeated herein. Based on actual design considerations, in some embodiments, reference may be made to the relevant descriptions of the multi-port power supply device 800, the control circuit 812_1, the power converter 830_1, and the USB port 840_1 shown in FIG. 8 for descriptions of the multi-port power supply device 100, the control circuit 112_1, the power converter 130_1, and the USB port 140_1 shown in FIG. 1.

In the embodiment shown in FIG. 8, the power converter 830_1 may supply power to the USB port 840_1 via a current path. The current detection circuit 850_1 and the power switch 860_1 are disposed in the current path between the power converter 830_1 and the USB port 840_1. Based on the control of the control circuit 812_1, the power switch 860_1 may turn off or turn on the current path. The current detection circuit 850_1 may detect an actual current I1 of the current path. The voltage detection circuit 870_1 may detect an actual voltage V1 of the current path between the power switch 860_1 and the USB port 840_1.

Figure 9:
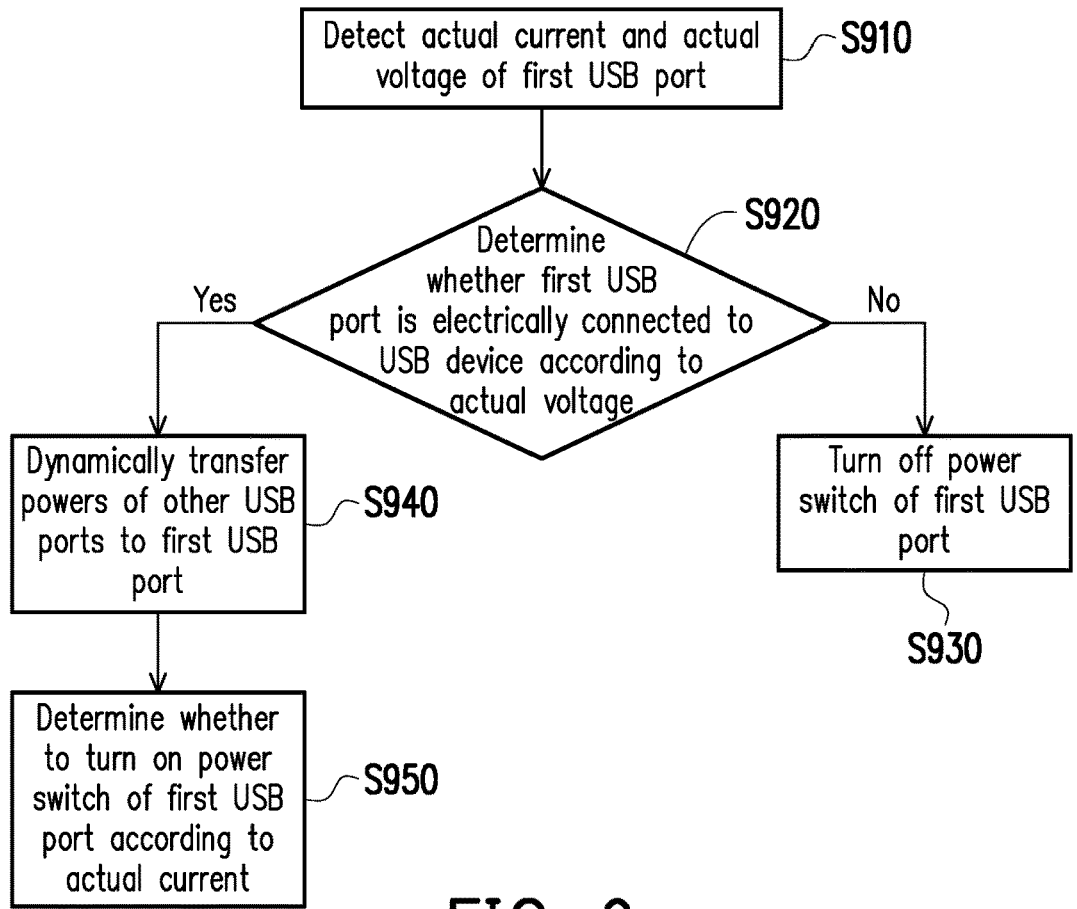
FIG. 9 is a flowchart of an operation method of a multi-port power supply device according to a further embodiment of the disclosure.

FIG. 9 is a flowchart of an operation method of a multi-port power supply device according to a further embodiment of the disclosure. Referring to FIG. 8 and FIG. 9, in step S910, the current detection circuit 850_1 may detect an actual current I1 of the current path between the power converter 830_1 and the USB port 840_1, and the voltage detection circuit 870_1 may detect an actual voltage V1 of the current path between the power switch 860_1 and the USB port 840_1. In step S920, the control circuit 812_1 may determine whether the USB port 840_1 (first USB port) is electrically connected to a USB device (not shown) according to the actual voltage V1.

The control circuit 812_1 may control the power switch 860_1. When the control circuit 812_1 determines that the USB port 840_1 is not electrically connected to a USB device (the determination result of step S920 is "No"), the control circuit 812_1 may perform step S930. In step S930, the control circuit 812_1 may turn off the power switch 860_1 of the USB port 840_1, and the control circuit 812_1 may disable the power converter 830_1.

When the control circuit 812_1 determines that the USB port 840_1 is electrically connected to a USB device (not shown) (the determination result of step S920 is "Yes"), the control circuit 812_1 may perform step S940. In step S940, the control circuit 812_1 may enable the power converter 830_1, and a part (or all) of the powers of other USB ports (not shown) of the multi-port power supply device 800 may be dynamically transferred to the USB port 840_1.

For example, the multi-port power supply device 800 further includes a power regulating circuit 811. Reference may be made to the relevant descriptions of the power regulating circuit 111 shown in FIG. 1 for descriptions of the power regulating circuit 811 shown in FIG. 8, which will not be repeated herein. The power regulating circuit 811 is coupled to the control circuit 812_1. When the control circuit 812_1 determines that the USB port 840_1 is electrically connected to a USB device (not shown), the control circuit 812_1 may notify the power regulating circuit 811, so that the power regulating circuit 811 dynamically transfers a part of the agreement powers of other USB ports (not shown) of the multi-port power supply device 800 to the USB port 840_1.

For example, it is assumed that the rated output power of the multi-port power supply device 800 is 100 W, and the 100 W has been allocated to other USB ports (not shown) of the multi-port power supply device 800. Also, it is assumed that the USB port 840_1 is a USB Type-A port. When the control circuit 812_1 notifies the power regulating circuit 811 that "the USB port 840_1 is electrically connected to a USB device", in step S940, the power regulating circuit 811 may dynamically transfer a part (e.g., 12 W, determined according to the actual design) of the agreement powers (e.g., 100 W in total) of other USB ports (not shown) to the USB port 840_1. After the transfer is completed, the agreement powers of other USB ports (not shown) is 88 W, and the agreement power of the USB port 840_1 is 12 W.

After a part of the agreement powers of other USB ports (not shown) of the multi-port power supply device 800 is dynamically transferred to the USB port 840_1, the control circuit 812_1 may determine in step S950 whether to turn on the power switch 860_1 of the USB port 840_1 (first USB port) according to the actual current I1. For example, when the actual current I1 is less than a threshold (e.g., 100 mA, determined according to the actual design), the control circuit 812_1 may turn off the power switch 860_1, and at this time, the power converter 830_1 may supply power to a power pin VBUS of the USB port 840_1 via a body diode of the power switch 860_1. When the actual current I1 is greater than the threshold (e.g., 100 mA), the control circuit 812_1 may turn on the power switch 860_1, so that the power converter 830_1 supplies power to the USB port 840_1 via the power switch 860_1.

The power regulating circuit 811 may correspondingly control the power converter 830_1 according to the power requirement of the USB port 840_1 to supply power to the USB device (not shown) connected to the USB port 840_1. In other words, the power regulating circuit 811 may determine the agreement power according to the power requirement of the USB port 840_1. The control circuit 812_1 may further notify the power regulating circuit 811 of the actual voltage V1 and the actual current I1. The power regulating circuit 811 may learn about the actual output power of the USB port 840_1 based on the actual voltage V1 and the actual current I1. The power regulating circuit 811 may dynamically transfer a power difference between the actual output power (first power) of the USB port 840_1 at a first time and the actual output power (second power) of the USB port 840_1 at a second time to other USB ports (not shown) of the multi-port power supply device 800. For example, referring to the relevant descriptions of step S750 shown in FIG. 7, the power regulating circuit 811 may dynamically transfer the power difference of the USB port 840_1 to other USB ports (not shown) of the multi-port power supply device 800.

Figure 10:
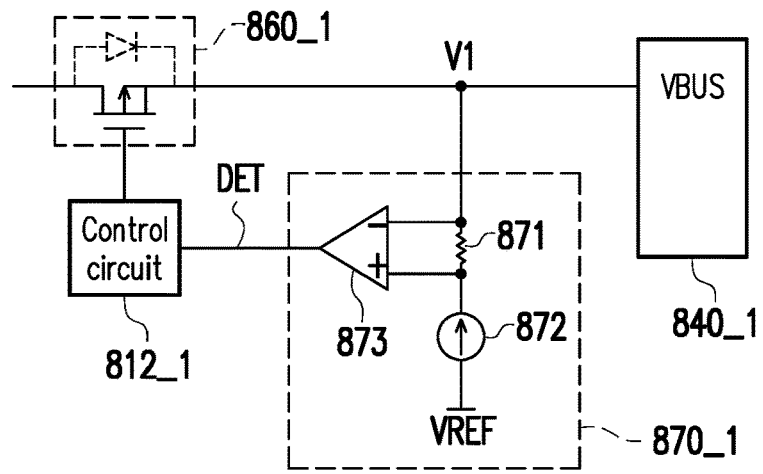
FIG. 10 is a circuit block diagram showing a voltage detection circuit shown in FIG. 8 according to an embodiment of the disclosure.

FIG. 10 is a circuit block diagram showing the voltage detection circuit 870_1 shown in FIG. 8 according to an embodiment of the disclosure. In the embodiment shown in FIG. 10, the voltage detection circuit 870_1 includes a resistor 871, a current source 872, and a voltage comparator 873. The resistance of the resistor 871 may be determined according to the actual design. For example, the resistance of the resistor 871 may be 1.3 KΩ or other resistances. A first terminal of the resistor 871 is coupled to the current path between the power switch 860_1 and the USB port 840_1 to receive the actual voltage V1. A first terminal of the current source 872 is coupled to a second terminal of the resistor 871 to provide a reference current (e.g., 300 uA, determined according to the actual design). A second terminal of the current source 872 is coupled to a reference voltage VREF (e.g., 5.5 V, determined according to the actual design). A first input terminal (e.g., an inverting input terminal) and a second input terminal (e.g., a non-inverting input terminal) of the voltage comparator 873 are respectively coupled to the first terminal and the second terminal of the resistor 871.

An output terminal of the voltage comparator 873 outputs a voltage comparison result DET to the control circuit 812_1. According to actual design considerations, the voltage comparator 873 may include a Schmitt trigger or other voltage comparison circuits/components.

When the USB port 840_1 is not electrically connected to a USB device (not shown), the reference voltage VREF pulls up the actual voltage V1 so that the actual voltage V1 is greater than 5 V. In addition, since no current flows through the resistor 871, the voltage comparison result DET outputted by the voltage comparator 873 is a low logic level.

When the USB port 840_1 is electrically connected to a USB device (not shown), the USB device pulls down the actual voltage V1 so that the actual voltage V1 is lower than 5 V, causing a current to flow through the resistor 871. Since a current flows through the resistor 871, the voltage comparison result DET outputted by the voltage comparator 873 is a high logic level. Therefore, the control circuit 812_1 may notify the power regulating circuit 811, so that the power regulating circuit 811 dynamically transfers a part of the agreement powers of other USB ports (not shown) of the multi-port power supply device 800 to the USB port 840_1.

After the power regulating circuit 811 transfers the power to the USB port 840_1, the control circuit 812_1 may determine whether to turn on the power switch 860_1 according to the actual current I1. For example, when the actual current I1 falls within the range of 1 mA to 100 mA, the control circuit 812_1 may turn off the power switch 860_1, and at this time, the power converter 830_1 may supply power to the power pin VBUS of the USB port 840_1 via the body diode of the power switch 860_1. When the actual current I1 falls within the range of 100 mA to 2.4 A, the control circuit 812_1 may turn on the power switch 860_1, so that the power converter 830_1 supplies power to the USB port 840_1 via the power switch 860_1.

Figure 11:
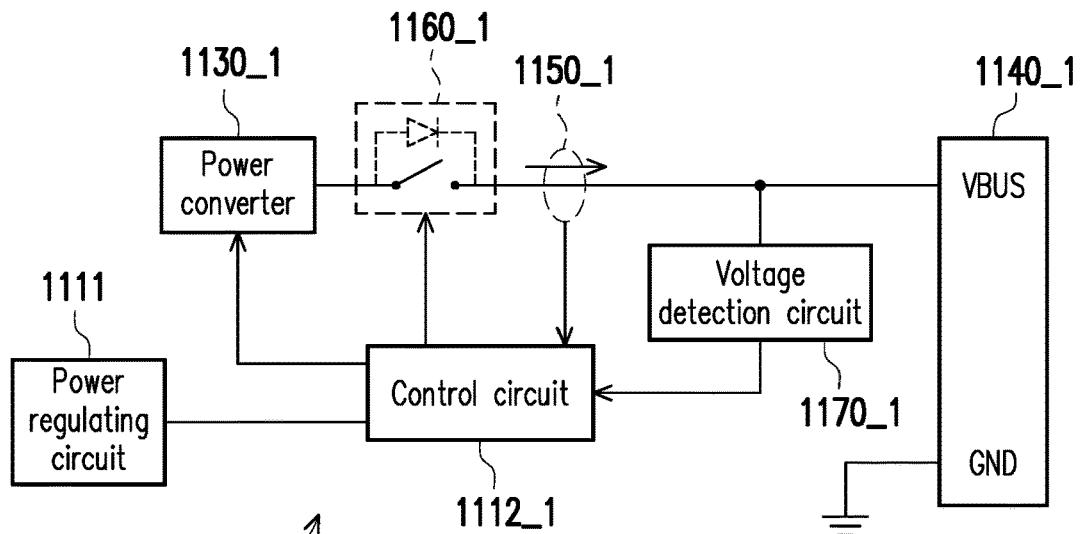
FIG. 11 is a circuit block diagram showing a multi-port power supply device according to another embodiment of the disclosure.

FIG. 11 is a circuit block diagram showing a multi-port power supply device 1100 according to another embodiment of the disclosure. In the embodiment shown in FIG. 11, the multi-port power supply device 1100 includes a plurality of USB ports such as a USB port 1140_1. The multi-port power supply device 1100 further includes a power regulating circuit 1111, a control circuit 1112_1, a power converter 1130_1, a current detection circuit 1150_1, a power switch 1160_1, and a voltage detection circuit 1170_1. Reference may be made to the relevant descriptions of the multi-port power supply device 800, the power regulating circuit 811, the control circuit 812_1, the power converter 830_1, the USB port 840_1, the current detection circuit 850_1, the power switch 860_1, and the voltage detection circuit 870_1 shown in FIG. 8 for descriptions of the multi-port power supply device 1100, the power regulating circuit 1111, the control circuit 1112_1, the power converter 1130_1, the USB port 1140_1, the current detection circuit 1150_1, the power switch 1160_1, and the voltage detection circuit 1170_1 shown in FIG. 11, which will not be repeated herein. The difference from the embodiment shown in FIG. 8 lies in that the current detection circuit 1150_1 shown in FIG. 11 is disposed in the current path between the power switch 1160_1 and the voltage detection circuit 1170_1.

Figure 12:
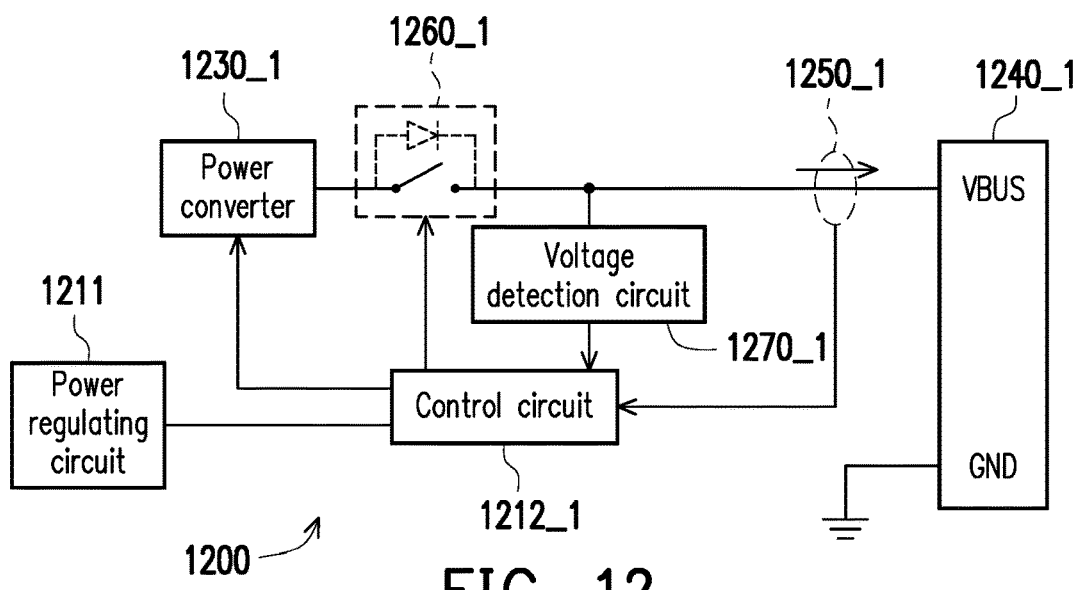
FIG. 12 is a circuit block diagram showing a multi-port power supply device according to still another embodiment of the disclosure.

FIG. 12 is a circuit block diagram showing a multi-port power supply device 1200 according to still another embodiment of the disclosure. In the embodiment shown in FIG. 12, the multi-port power supply device 1200 includes a plurality of USB ports such as a USB port 1240_1. The multi-port power supply device 1200 further includes a power regulating circuit 1211, a control circuit 1212_1, a power converter 1230_1, a current detection circuit 1250_1, a power switch 1260_1, and a voltage detection circuit 1270_1. Reference may be made to the relevant descriptions of the multi-port power supply device 800, the power regulating circuit 811, the control circuit 812_1, the power converter 830_1, the USB port 840_1, the current detection circuit 850_1, the power switch 860_1, and the voltage detection circuit 870_1 shown in FIG. 8 for descriptions of the multi-port power supply device 1200, the power regulating circuit 1211, the control circuit 1212_1, the power converter 1230_1, the USB port 1240_1, the current detection circuit 1250_1, the power switch 1260_1, and the voltage detection circuit 1270_1 shown in FIG. 12, which will not be repeated herein. The difference from the embodiment shown in FIG. 8 lies in that the current detection circuit 1250_1 shown in FIG. 12 is disposed in the current path between the voltage detection circuit 1270_1 and the USB port 1240_1.

According to different design requirements, the common control circuit 110, the power regulating circuit 111, the control circuit 112_1, the control circuit 112_2, the power regulating circuit 811, the control circuit 812_1, the power regulating circuit 1111, the control circuit 1112_1, the power regulating circuit 1211, and/or the control circuit 1212_1 described above may be implemented in the form of hardware, firmware, software (program), or a combination of multiple ones of the above three forms. In terms of hardware, the common control circuit 110, the power regulating circuit 111, the control circuit 112_1, the control circuit 112_2, the power regulating circuit 811, the control circuit 812_1, the power regulating circuit 1111, the control circuit 1112_1, the power regulating circuit 1211, and/or the control circuit 1212_1 described above may be implemented in a logic circuit on an integrated circuit. Relevant functions of the common control circuit 110, the power regulating circuit 111, the control circuit 112_1, the control circuit 112_2, the power regulating circuit 811, the control circuit 812_1, the power regulating circuit 1111, the control circuit 1112_1, the power regulating circuit 1211, and/or the control circuit 1212_1 described above may be implemented as hardware by using hardware description languages (e.g., Verilog HDL or VHDL) or other suitable programming languages. For example, relevant functions of the common control circuit 110, the power regulating circuit 111, the control circuit 112_1, the control circuit 112_2, the power regulating circuit 811, the control circuit 812_1, the power regulating circuit 1111, the control circuit 1112_1, the power regulating circuit 1211, and/or the control circuit 1212_1 may be implemented in various logic blocks, modules, and circuits in one or more controllers, microcontrollers, microprocessors, application-specific integrated circuits (ASIC), digital signal processors (DSP), field programmable gate arrays (FPGA), and/or other processing units.

In terms of software and/or firmware, relevant functions of the common control circuit 110, the power regulating circuit 111, the control circuit 112_1, the control circuit 112_2, the power regulating circuit 811, the control circuit 812_1, the power regulating circuit 1111, the control circuit 1112_1, the power regulating circuit 1211, and/or the control circuit 1212_1 described above implemented as programming codes. For example, the common control circuit 110, the power regulating circuit 111, the control circuit 112_1, the control circuit 112_2, the power regulating circuit 811, the control circuit 812_1, the power regulating circuit 1111, the control circuit 1112_1, the power regulating circuit 1211, and/or the control circuit 1212_1 may be implemented by using general programming languages (e.g., C, C++, or assembly languages) or other suitable programming languages. The programming codes may be recorded/stored in a "non-transitory computer readable medium". In some embodiments, the non-transitory computer readable medium includes, for example, read only memory (ROM) and/or a storage device. The storage device includes a hard disk drive (HDD), a solid-state drive (SSD), or other storage devices. A central processing unit (CPU), a controller, a microcontroller, or a microprocessor may read and execute the programming codes from the non-transitory computer readable medium to realize relevant functions of the common control circuit 110, the power regulating circuit 111, the control circuit 112_1, the control circuit 112_2, the power regulating circuit 811, the control circuit 812_1, the power regulating circuit 1111, the control circuit 1112_1, the power regulating circuit 1211, and/or the control circuit 1212_1.

In summary of the above, in some embodiments, the multi-port power supply device may check the adjustment trend of the agreement power of the USB port. When the agreement power is greater than the rated minimum charging power of the USB device, the common control circuit may dynamically change the agreement power according to the actual power requirement of the USB device. When the agreement power may be less than the rated minimum charging power of the USB device, the common control circuit may keep the agreement power unchanged and dynamically transfer a power difference between the agreement power and the actual output power to at least one other USB port. Therefore, the power utilization efficiency of the multi-port power supply device can be optimized. In some embodiments, after a part (or all) of the powers of other USB ports is dynamically transferred to the first USB port, the multi-port power supply device may determine whether to turn on the power switch according to the actual current. Therefore, the multi-port power supply device can manage the power supply to the USB ports and avoid occurrence of overcurrent and/or overvoltage in the multi-port power supply device. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A multi-port power supply device comprising:
a plurality of USB ports comprising a first USB port;
a power converter configured to supply power to the first USB port via a current path;
a power switch disposed in the current path;
a current detection circuit disposed in the current path and configured to detect an actual current of the current path;
a voltage detection circuit configured to detect an actual voltage of the current path between the power switch and the first USB port; and
a control circuit configured to control the power switch, wherein the control circuit determines whether the first USB port is electrically connected to a USB device according to the actual voltage, wherein
when the control circuit determines that the first USB port is not electrically connected to the USB device, the control circuit turns off the power switch, and
when the control circuit determines that the first USB port is electrically connected to the USB device, after a part of an agreement power of at least one other USB port among the USB ports is dynamically transferred to the first USB port, the control circuit determines whether to turn on the power switch according to the actual current to dynamically transfer the part of the agreement power of the at least one other USB port to the first USB port.

2. The multi-port power supply device according to claim 1, wherein
when the actual current is less than a threshold, the control circuit turns off the power switch, and the power converter supplies power to the first USB port via a body diode of the power switch, and
when the actual current is greater than the threshold, the control circuit turns on the power switch, so that the power converter supplies power to the first USB port via the power switch.

3. The multi-port power supply device according to claim 1, wherein
when the control circuit determines that the first USB port is not electrically connected to the USB device, the control circuit disables the power converter, and
when the control circuit determines that the first USB port is electrically connected to the USB device, the control circuit enables the power converter.

4. The multi-port power supply device according to claim 1, further comprising:
a power regulating circuit coupled to the control circuit, wherein when the control circuit determines that the first USB port is electrically connected to the USB device, the control circuit notifies the power regulating circuit to dynamically transfer a part of the agreement power of the at least one other USB port of the multi-port power supply device to the first USB port.

5. The multi-port power supply device according to claim 4, wherein the control circuit notifies the power regulating circuit of the actual voltage and the actual current, and the power regulating circuit dynamically transfers a power difference between a first power of the first USB port at a first time and a second power of the first USB port at a second time to the at least one other USB port which is connected to another USB device.

6. The multi-port power supply device according to claim 1, wherein the power converter comprises a DC to DC converter.

7. The multi-port power supply device according to claim 1, wherein the voltage detection circuit comprises:
a resistor having a first terminal coupled to the current path to receive the actual voltage;
a current source coupled to a second terminal of the resistor to provide a reference current, wherein the current source is coupled to a reference voltage; and
a voltage comparator having a first input terminal and a second input terminal respectively coupled to the first terminal and the second terminal of the resistor, wherein an output terminal of the voltage comparator outputs a voltage comparison result.

8. The multi-port power supply device according to claim 7, wherein the voltage comparator comprises a Schmitt trigger.

9. An operation method of a multi-port power supply device, wherein the multi-port power supply device comprises a plurality of USB ports, a power converter, a power switch, a current detection circuit, a voltage detection circuit, and a control circuit, the USB ports comprise a first USB port, the power converter is adapted to supply power to the first USB port via a current path, and the power switch is disposed in the current path, the operation method comprising:

detecting, by the current detection circuit, an actual current of the current path;
detecting, by the voltage detection circuit, an actual voltage of the current path between the power switch and the first USB port;
determining, by the control circuit, whether the first USB port is electrically connected to a USB device according to the actual voltage;
having determined by the control circuit that the first USB port is not electrically connected to the USB device, turning off the power switch by the control circuit; and
having determined by the control circuit that the first USB port is electrically connected to the USB device, after a part of an agreement power of at least one other USB port among the USB ports is dynamically transferred to the first USB port, determining, by the control circuit, whether to turn on the power switch according to the actual current to dynamically transfer the part of the agreement power of the at least one other USB port to the first USB port.

10. The operation method according to claim 9, further comprising:
having determined by the control circuit that the actual current is less than a threshold, turning off the power switch by the control circuit, and supplying power, by the power converter, to the first USB port via a body diode of the power switch; and
having determined by the control circuit that the actual current is greater than the threshold, turning on the power switch by the control circuit, so that the power converter supplies power to the first USB port via the power switch.

11. The operation method according to claim 9, further comprising:
having determined by the control circuit that the first USB port is not electrically connected to the USB device, disabling the power converter by the control circuit; and
having determined by the control circuit that that the first USB port is electrically connected to the USB device, enabling the power converter by the control circuit.

12. The operation method according to claim 9, further comprising:
having determined by the control circuit that the first USB port is electrically connected to the USB device, notifying, by the control circuit, a power regulating circuit of the multi-port power supply device to dynamically transfer a part of the agreement power of the at least one other USB port of the multi-port power supply device to the first USB port.

13. The operation method according to claim 12, further comprising:
notifying, by the control circuit, the power regulating circuit of the actual voltage and the actual current; and
dynamically transferring, by the power regulating circuit, a power difference between a first power of the first USB port at a first time and a second power of the first USB port at a second time to the at least one other USB port which is connected to another USB device.

14. The operation method according to claim 9, wherein the power converter comprises a DC to DC converter.

* * * * *